US011838897B2

(12) United States Patent
Tseng et al.

(10) Patent No.: US 11,838,897 B2
(45) Date of Patent: Dec. 5, 2023

(54) SYSTEMS, DEVICES, AND METHODS FOR PACKET DATA CONVERGENCE PROTOCOL PACKET DATA UNIT DUPLICATION

(71) Applicant: FG Innovation Company Limited, Tuen Mun (HK)

(72) Inventors: Yung-Lan Tseng, Taipei (TW); Chie-Ming Chou, Taipei (TW); Mei-Ju Shih, Taipei (TW); Chia-Hung Wei, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/867,002

(22) Filed: Jul. 18, 2022

(65) Prior Publication Data
US 2022/0353848 A1 Nov. 3, 2022

Related U.S. Application Data

(60) Continuation of application No. 16/900,808, filed on Jun. 12, 2020, now abandoned, which is a division of
(Continued)

(51) Int. Cl.
*H04W 72/02* (2009.01)
*H04W 36/00* (2009.01)
(Continued)

(52) U.S. Cl.
CPC ............. *H04W 72/02* (2013.01); *H04L 1/08* (2013.01); *H04L 1/16* (2013.01); *H04L 5/0055* (2013.01);
(Continued)

(58) Field of Classification Search
CPC ............. H04W 72/02; H04W 36/0072; H04W 72/1284; H04W 76/12; H04L 1/08;
(Continued)

(56) References Cited

U.S. PATENT DOCUMENTS

2015/0092707 A1 4/2015 Kwon
2017/0201603 A1 7/2017 Uchino et al.
(Continued)

FOREIGN PATENT DOCUMENTS

| CN | 105637967 A | 6/2016 |
| CN | 110771082 A | 2/2020 |
| WO | 2017023438 A1 | 2/2017 |

OTHER PUBLICATIONS

3rd Generation Partnership Project; Technical Specification Group Radio Access Network; Evolved Universal Terrestrial Radio Access (E-UTRA); Radio Resource Control (RRC); Protocol specification (Release 15), "3GPP TS 36.331", V15.4.0 (Dec. 2018).
(Continued)

*Primary Examiner* — Pao Sinkantarakorn
*Assistant Examiner* — Kabir U Jahangir
(74) *Attorney, Agent, or Firm* — ScienBiziP, P.C.

(57) ABSTRACT

A method performed by a first base station (BS) in a secondary cell group (SCG) associated with a user equipment (UE) is provided. The method receives, from a second BS in a master cell group (MCG) associated with the UE, a request for a configuration for packet data convergence protocol (PDCP) data duplication. The method then generates a mapping configuration for the PDCP data duplication in the SCG after receiving the request. The method transmits, to the UE, the mapping configuration.

20 Claims, 14 Drawing Sheets

Related U.S. Application Data application No. 16/015,229, filed on Jun. 22, 2018, now Pat. No. 10,728,878.

(60) Provisional application No. 62/523,367, filed on Jun. 22, 2017.

(51) Int. Cl.
    *H04W 76/12*     (2018.01)
    *H04L 5/00*     (2006.01)
    *H04L 1/16*     (2023.01)
    *H04L 1/08*     (2006.01)
    *H04W 72/21*     (2023.01)

(52) U.S. Cl.
CPC ....... *H04W 36/0072* (2013.01); *H04W 72/21* (2023.01); *H04W 76/12* (2018.02)

(58) Field of Classification Search
CPC ......... H04L 1/16; H04L 5/0055; H04L 5/001; H04L 5/0053
See application file for complete search history.

(56) References Cited

U.S. PATENT DOCUMENTS

| | | | |
|---|---|---|---|
| 2018/0098250 A1 | 4/2018 | Vrzic et al. | |
| 2018/0309660 A1 | 10/2018 | Loehr et al. | |
| 2018/0324641 A1 | 11/2018 | Tsai et al. | |
| 2018/0332501 A1* | 11/2018 | Tseng | H04L 1/08 |
| 2018/0367463 A1 | 12/2018 | Jose et al. | |
| 2018/0368200 A1* | 12/2018 | Jin | H04L 1/189 |
| 2019/0159274 A1 | 5/2019 | Hong et al. | |
| 2019/0289489 A1 | 9/2019 | Yi et al. | |
| 2020/0112879 A1 | 4/2020 | Shimoda et al. | |
| 2020/0170072 A1* | 5/2020 | Xiao | H04L 5/0032 |
| 2020/0314805 A1 | 10/2020 | Tseng et al. | |
| 2021/0112610 A1 | 4/2021 | Xiao et al. | |

OTHER PUBLICATIONS

3rd Generation Partnership Project; Technical Specification Group Radio Access Network; Study on New Radio Access Technology; Radio Interface Protocol Aspects (Release 14), "3GPP TR 38.804", V14.0.0 (Mar. 2017).

RAN2 Chairman (Intel), "3GPP TSG-RAN WG2 Meeting #98", R2-1704000, Hangzhou, China, May 15-19, 2017.

NTT Docomo, Inc., "Activation/deactivation for NR", 3GPP TSG-RAN WG2 Meeting 98, R2-1704338, Hangzhou, China, May 15-19, 2017, Re-submission of R2-1703169.

LG Electronics Inc., "Packet duplication in CA", 3GPP TSG-RAN WG2 Meeting #97bis, R2-170xxxx, Spokane, USA, Apr. 3-7, 2017.

Huawei, HiSilicon, "Configuration and control of packet duplication", R2-1706716, 3GPP TSG RAN WG2 NR Ad Hoc, Qingdao, China, Jun. 27-29, 2017, Section 2.2.

Sharp, "PDCP Duplication in CA", R2-1706791, 3GPP TSG-RAN2 Adhoc Meeting, Qingdao, China, Jun. 27-29, 2017.

Huawei, "Email discussion summary on control of UL PDCP duplication", R2-1704834, 3GPP TSG-RAN2#98, Hangzhou, China, May 15-19, 2017.

CATT, "PDCP Duplication", R2-1703114, 3GPP TSG-RAN WG2 Meeting #97bis, Spokane, USA, Apr. 3-7, 2017.

Samsung, "Further Discussion on Packet Duplication", R2-1707366, 3GPP TSG-RAN WG2 Ad-hoc NR#2, Qingdao, China, Jun. 27-29, 2017.

Huawei et al., "Configuration and control of packet duplication", R2-1706716, 3GPP TSG RAN WG2 NR Ad Hoc, Qingdao, China, Jun. 27-29, 2017.

Non-Final Rejection dated Dec. 8, 2021 for U.S. Appl. No. 16/900,808 which is the parent application of the Instant application.

Notice of Allowance dated Apr. 19, 2022 for U.S. Appl. No. 16/900,808 which is the parent application of the Instant application.

Non-Final Rejection dated Nov. 7, 2019 U.S. Appl. No. 16/015,229 which is the family application of the instant application.

Notice of Allowance dated Apr. 1, 2020 U.S. Appl. No. 16/015,229 which is the family application of the Instant application.

* cited by examiner

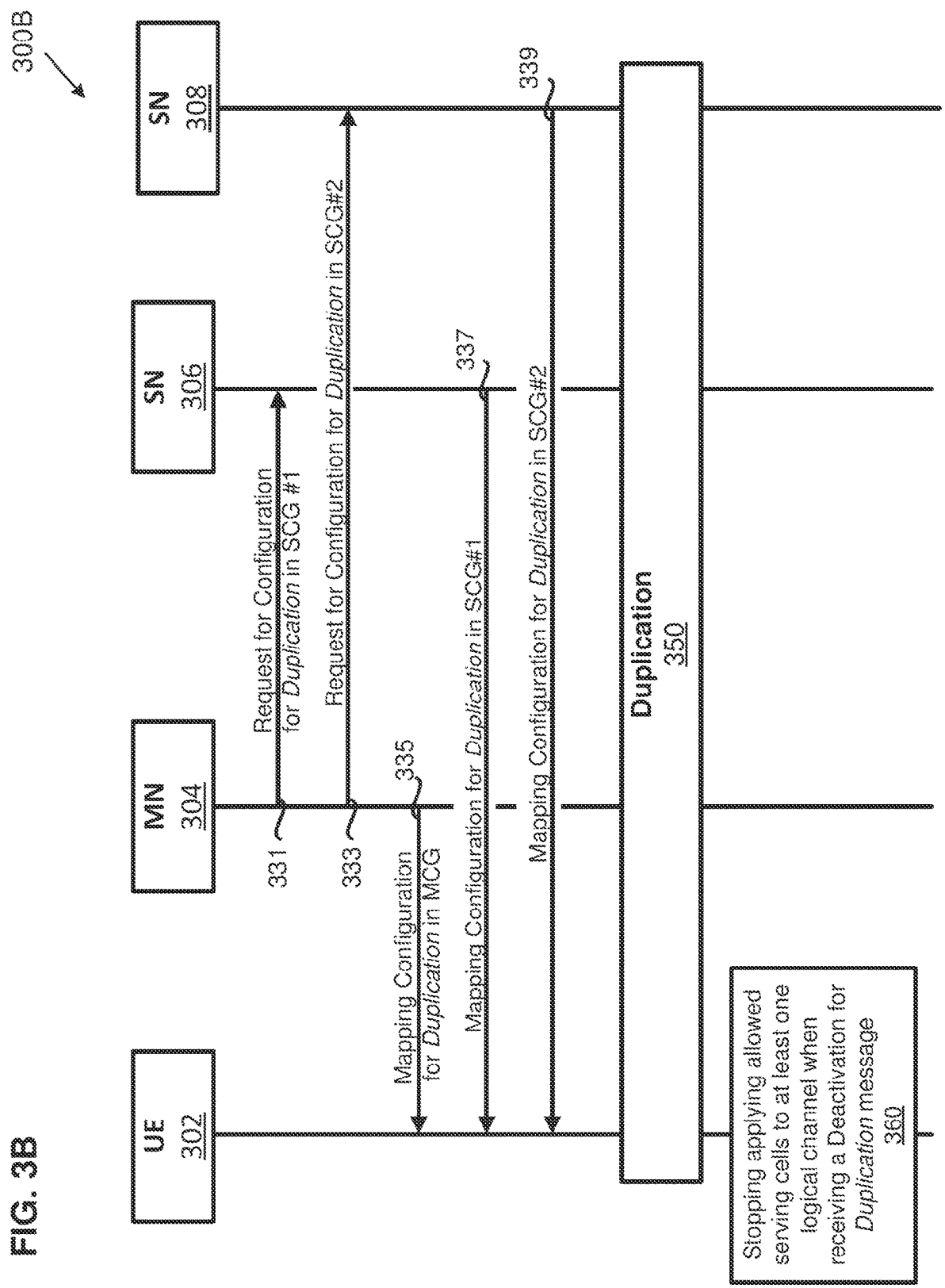

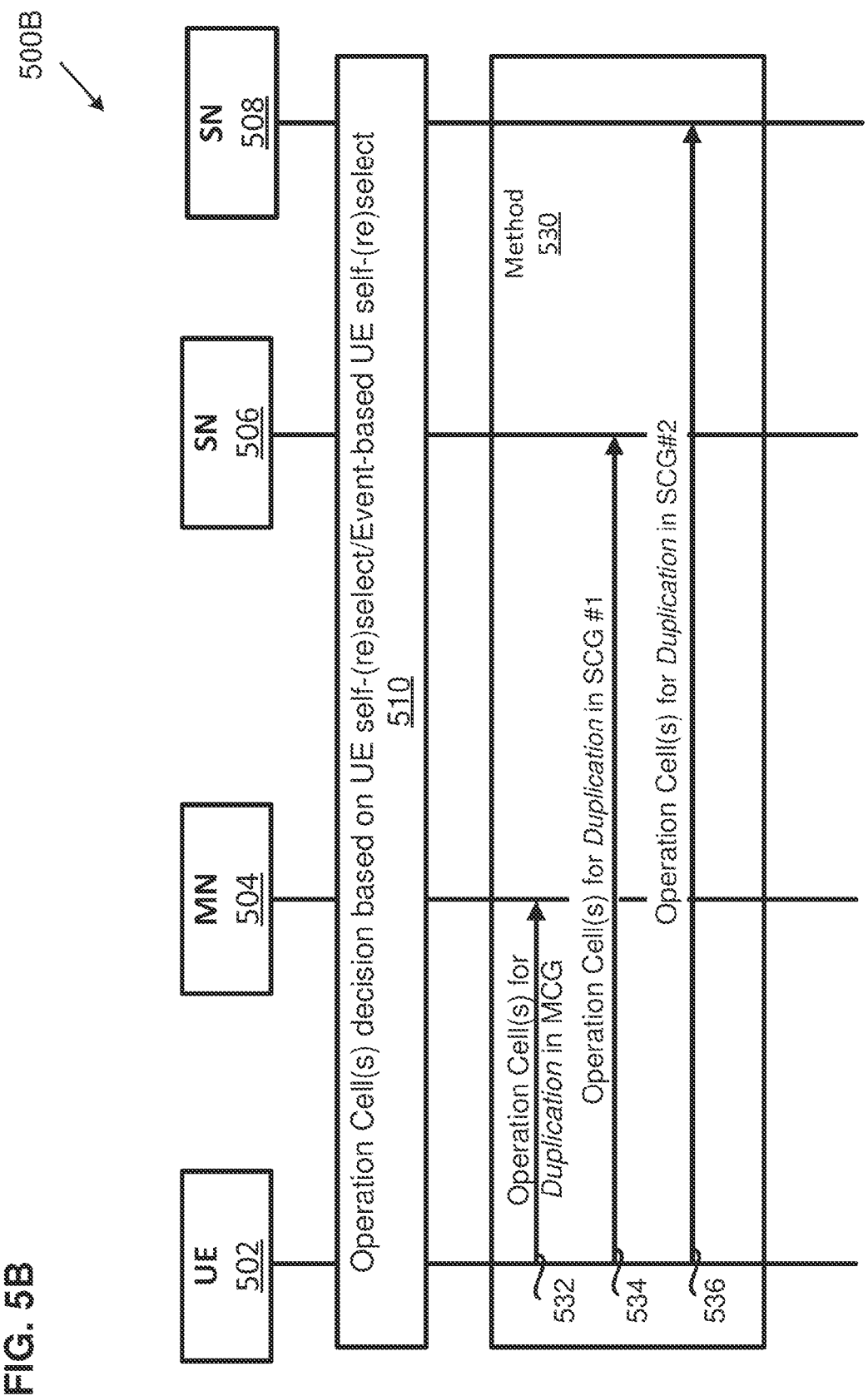

SYSTEMS, DEVICES, AND METHODS FOR PACKET DATA CONVERGENCE PROTOCOL PACKET DATA UNIT DUPLICATION

CROSS-REFERENCE TO RELATED APPLICATION(S)

This application is a continuation application of U.S. patent application Ser. No. 16/900,808, filed on Jun. 12, 2020, which is a divisional application of U.S. patent application Ser. No. 16/015,229, filed on Jun. 22, 2018, now issued as U.S. Pat. No. 10,728,878, which claims the benefit of and priority to U.S. Provisional Patent Application Ser. No. 62/523,367, filed on Jun. 22, 2017. The contents of all above-named applications are hereby fully incorporated herein by reference in their entirety.

FIELD

The present disclosure generally relates to wireless communication systems. More specifically, the present disclosure relates to systems, devices, and methods for mapping configurations and resource configurations for Packet Data Convergence Protocol (PDCP) Packet Data Unit (PDU) Duplication (hereinafter also referred to as "Duplication").

BACKGROUND

Various efforts have been made to improve the performances of wireless communications, such as data rate, latency, reliability, mobility and etc., for the next generation (e.g., 5G) wireless communication networks. Among the goals, the next generation wireless communication networks are expected to provide high reliability for ultra-reliable low latency communication (URLLC) service while under strict latency requirements.

Although according to the 3rd Generation Partnership Project (3GPP) Technical Report (TR) 38.804, PDCP PDU Duplication under carrier aggregation (CA), dual-connectivity (DC), and multi-connectivity (MC) operations will be supported for Data Radio Bearers (DRBs) and Signaling Radio Bearers (SRBs), the details on how to apply PDCP PDU duplication (e.g., uplink and downlink Duplications) have not been extensively discussed.

Thus, there is a need in the art for efficient systems, devices, and methods for PDCP PDU duplication.

SUMMARY

The present disclosure is directed to systems, methods, and devices for PDCP PDU duplication.

According to a first aspect of the present disclosure a method for a user equipment (UE) to deliver one or more duplicated packet data convergence protocol (PDCP) packets of a radio bearer is disclosed, the method comprising: selecting at least one physical radio resource block on one or more allowed serving cells to deliver the one or more duplicated PDCP packets after receiving an activation message of packet duplication to activate at least one logical channel corresponding to the radio bearer to deliver the one or more duplicated PDCP packets; stopping applying the one or more allowed serving cells to the at least one logical channel when receiving a deactivation message of packet duplication.

In an implementation of the first aspect, the method further comprises: receiving, by the UE, a mapping configuration from a base station; where the one or more allowed serving cells are configured by the base station based on the mapping configuration, and the mapping configuration provides mapping rules between logical channels and serving cells to indicate one or more indices of the one or more allowed serving cells of the at least one logical channel through which the UE is allowed to deliver the one or more duplicated PDCP packets.

In another implementation of the first aspect, the mapping rules include at least one Serving Cell index corresponding to at least one of the one or more allowed serving cells in the mapping configuration.

In yet another implementation of the first aspect, the Serving Cell index value=0 is mapped to a special cell of a cell group corresponding to the at least one logical channel, the special cell is a primary cell (PCell) in a master cell group (MCG) or a primary secondary cell (PSCell) in a secondary cell group (SCG).

In yet another implementation of the first aspect, the at least one logical channel is configured with at least one of the one or more allowed serving cells, wherein the one or more allowed serving cells are associated with one or more serving cell groups.

In yet another implementation of the first aspect, the at least one logical channel is configured with at least one of the one or more allowed serving cells, wherein the one or more allowed serving cells are associated with a master cell group and at least one secondary cell group.

In yet another implementation of the first aspect, the mapping configuration is provided by the special cell of the cell group corresponding to the at least one logical channel, the special cell is the PCell in the MCG or the PSCell in the SCG.

In yet another implementation of the first aspect, the method further comprises selecting or re-selecting, by the UE, at least another serving cell to deliver the one or more duplicated PDCP packets based on one or more predefined triggering events.

In yet another implementation of the first aspect, one of the one or more predefined triggering events is related to channel qualities of the one or more allowed serving cells.

In yet another implementation of the first aspect, one of the one or more predefined triggering events is based on acknowledgement/non-acknowledgement (ACK/NACK) responses of PDCP packet delivery in each of the one or more allowed serving cells.

In yet another implementation of the first aspect, one of the one or more predefined triggering events is based on a channel occupancy ratio of shared radio resource among UEs in each of the one or more allowed serving cells.

In yet another implementation of the first aspect, one of the one or more predefined triggering events is based on a buffer status of the one or more duplicated PDCP packets associated with the at least one logical channel configured for PDCP packet delivery.

In yet another implementation of the first aspect, one of the one or more predefined triggering events is based on deactivation of at least one of the one or more allowed serving cells.

In yet another implementation of the first aspect, one of the one or more predefined triggering events is based on a radio link failure to a cell group of the one or more allowed serving cells.

In yet another implementation of the first aspect, the method further comprises: disabling a de-activation timer of at least one of the one or more allowed serving cells after receiving the activation message of packet duplication;

enabling the disabled de-activation timer after receiving a deactivation message of packet duplication.

In yet another implementation of the first aspect, the method further comprises: sending a special buffer status report to a base station for an uplink (UL) grant request to transmit the one or more duplicated PDCP packets.

In a second aspect of the present disclosure, a user equipment (UE) is disclosed, the UE comprising: one or more processors; one or more non-transitory, computer-readable media, coupled with the one or more processors, having executable instructions embodied thereon, which, when executed by the one or more processors cause the one or more processors to perform operations comprising: selecting at least one physical radio resource block on one or more allowed serving cells to deliver one or more duplicate packet data convergence protocol (PDCP) packets of a radio bearer after receiving an activation message of packet duplication to activate at least one logical channel corresponding to the radio bearer to deliver the one or more duplicate PDCP packets; stopping applying the one or more allowed serving cells to the at least one logical channel when receiving a deactivation message of packet duplication.

In an implementation of the second aspect, the executable instructions, when executed by the one or more processors, cause the one or more processors to further perform operations comprising: receiving a mapping configuration from a base station; wherein the one or more allowed serving cells are configured by the base station based on the mapping configuration, and the mapping configuration provides mapping rules between logical channels and serving cells to indicate one or more indices of the one or more allowed serving cells of the at least one logical channel through which the UE is allowed to deliver the one or more duplicate PDCP packets.

In another implementation of the second aspect, the mapping rules include at least one SCell index corresponding to at least one of the one or more allowed serving cells in the mapping configuration.

In yet another implementation of the second aspect, the at least one logical channel is configured with at least one of the one or more allowed serving cells, wherein the one or more allowed serving cells are associated with one or more serving cell groups.

In yet another implementation of the second aspect, the at least one logical channel is configured with at least one of the one or more allowed serving cells, wherein the one or more allowed serving cells are associated with a master cell group and at least one secondary cell group.

In yet another implementation of the second aspect, the mapping configuration is provided by a primary cell of the master cell group.

In yet another implementation of the second aspect, the mapping configuration is provided by a primary secondary cell of the at least one secondary cell group.

In yet another implementation of the second aspect, the executable instructions, when executed by the one or more processors, cause the one or more processors to further perform operations comprising: selecting or re-selecting, by the UE, at least another serving cell to deliver the one or more duplicate PDCP packets based on one or more predefined triggering events.

In yet another implementation of the second aspect, one of the one or more predefined triggering events is related to channel qualities of the one or more allowed serving cells.

In yet another implementation of the second aspect, one of the one or more predefined triggering events is based on acknowledgement/non-acknowledgement (ACK/NACK) responses of PDCP packet delivery in each of the one or more allowed serving cells.

In yet another implementation of the second aspect, one of the one or more predefined triggering events is based on a channel occupancy ratio of shared radio resource among UEs in each of the one or more allowed serving cells.

In yet another implementation of the second aspect, one of the one or more predefined triggering events is based on a buffer status of the duplicate PDCP packets associated with the at least one logical channel configured for PDCP packet delivery.

In yet another implementation of the second aspect, one of the one or more predefined triggering events is based on deactivation of at least one of the one or more allowed serving cells.

In yet another implementation of the second aspect, one of the one or more predefined triggering events is based on a radio link failure to a cell group of the one or more allowed serving cells.

In yet another implementation of the second aspect, the executable instructions, when executed by the one or more processors, cause the one or more processors to further perform operations comprising: disabling a de-activation timer of at least one of the one or more allowed serving cells after receiving the activation message of packet duplication; enabling the disabled de-activation timer after receiving a deactivation message of packet duplication.

In yet another implementation of the second aspect, the executable instructions, when executed by the one or more processors, cause the one or more processors to further perform operations comprising: sending a special buffer status report to a base station for an uplink (UL) grant request to transmit the one or more duplicated PDCP packets.

In a third aspect of the present disclosure, a first base station (BS) in a secondary cell group (SCG) associated with a user equipment (UE) is disclosed. The first BS includes one or more non-transitory computer-readable media storing computer-executable instructions and at least one processor coupled to the one or more non-transitory computer-readable media. The at least one processor is configured to execute the computer-executable instructions to: receive, from a second BS in a master cell group (MCG) associated with the UE, a request for a configuration for packet data convergence protocol (PDCP) data duplication; generate a mapping configuration for the PDCP data duplication in the SCG after receiving the request; and transmit, to the UE, the mapping configuration.

In an implementation of the second aspect, the at least one processor is further configured to execute the computer-executable instructions to configure, based on the mapping configuration, a set of allowed serving cells in the SCG for receiving one or more duplicated PDCP packets, the set of allowed serving cells including at least one primary secondary cell (PSCell) and one or more secondary cells (SCells) of the SCG.

In another implementation of the second aspect, the mapping configuration provides mapping rules between a set of logical channels and the set of allowed serving cells.

In another implementation of the second aspect, the mapping configuration provides a set of serving cell indices corresponding to the set of allowed serving cells for receiving the one or more duplicated PDCP packets.

In another implementation of the second aspect, a serving cell index in the set of serving cell indices that has a value of zero is mapped to the PSCell in the SCG that corresponds to at least one logical channel through which the UE is allowed to deliver the one or more duplicated PDCP packets.

In another implementation of the second aspect, the mapping configuration for the PDCP data duplication includes information of at least one physical radio resource block on a set of allowed serving cells for receiving one or more duplicated PDCP packets from the UE.

In another implementation of the second aspect, the at least one processor is further configured to execute the computer-executable instructions to transmit, to the UE, a PDCP data duplication activation message to activate at least one logical channel corresponding to at least one radio bearer of the UE to deliver one or more duplicated PDCP packets.

In another implementation of the second aspect, the at least one processor is further configured to execute the computer-executable instructions to receive, from the UE, the one or more duplicated PDCP packets in the at least one logical channel corresponding to the at least one radio bearer of the UE.

In another implementation of the second aspect, the at least one processor is further configured to execute the computer-executable instructions to transmit, to the UE, a PDCP data duplication deactivation message to stop the UE from applying one or more allowed serving cells in the SCG to the at least one logical channel.

In another implementation of the second aspect, the second BS further transmits, to the UE, a second mapping configuration for PDCP data duplication in the MCG.

In a fourth aspect of the present disclosure, a method performed by a first base station (BS) in a secondary cell group (SCG) associated with a user equipment (UE) is disclosed. The method includes receiving, from a second BS in a master cell group (MCG) associated with the UE, a request for a configuration for packet data convergence protocol (PDCP) data duplication; generating a mapping configuration for the PDCP data duplication in the SCG after receiving the request; and transmitting, to the UE, the mapping configuration.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

FIG. 3B is a diagram illustrating a master node and two or more secondary nodes each providing a mapping configuration for Duplication to a UE, in accordance with an example implementation of the present disclosure.

FIG. 5B is a diagram showing a method of a UE informing operation cell(s) for Duplication to various network nodes, in accordance with an example implementation of the present disclosure.

DETAILED DESCRIPTION

Figure 1:
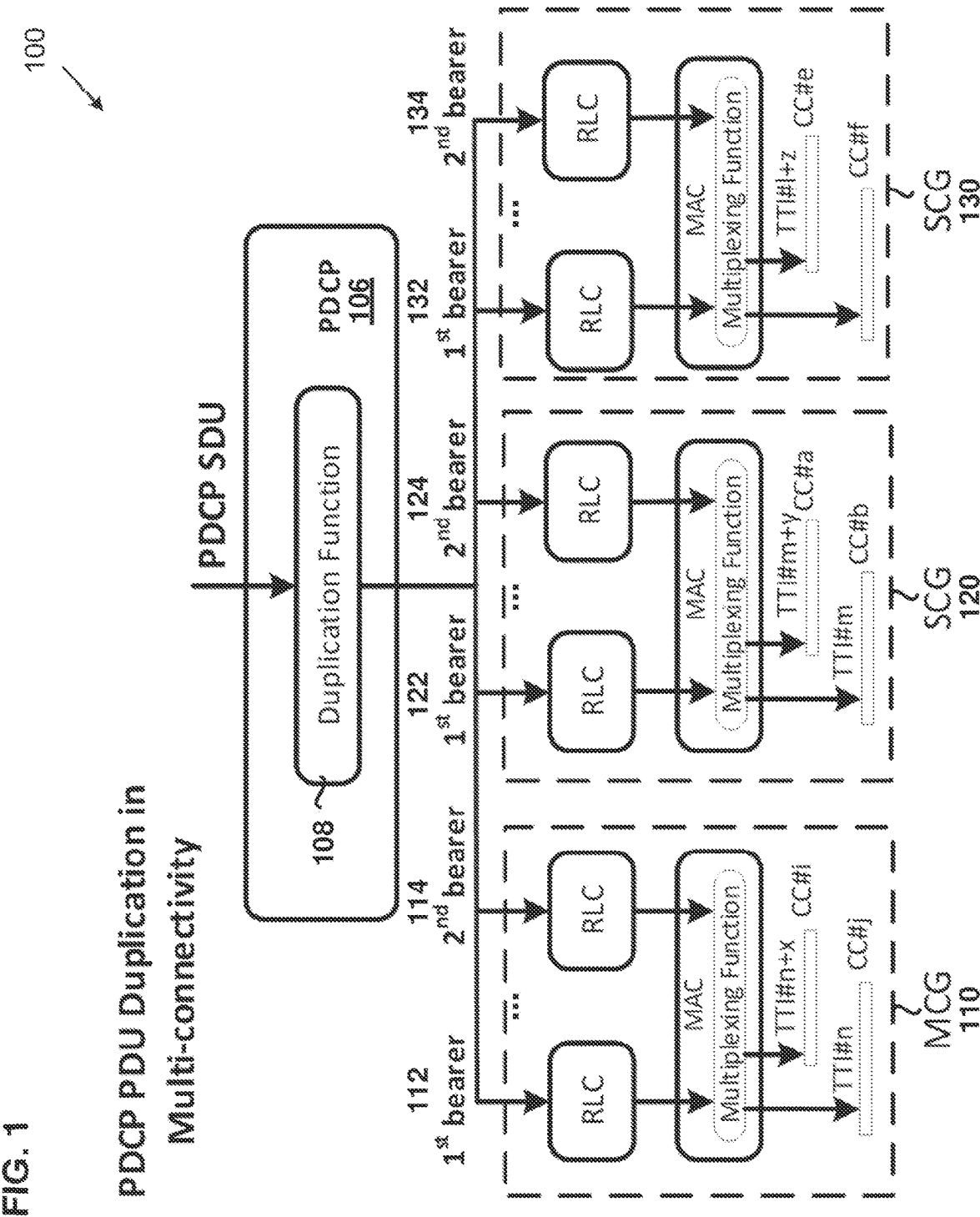
FIG. 1 is a schematic diagram illustrating multi-connectivity, dual-connectivity, and carrier aggregation Duplication operations, in accordance with an example implementation of the present disclosure.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of one or more application-specific integrated circuits (ASICs), programmable logic arrays, and/or using one or more digital signal processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., a long term evolution (LTE) system, a LTE-Advanced (LTE-A) system, or a LTE-Advanced Pro system) typically includes at least one base station, at least one user equipment (UE), and one or more optional network elements that provide connection towards a network. The UE communicates with the network (e.g., a core network (CN), an evolved packet core (EPC) network, an Evolved Universal Terrestrial Radio Access network (E-UTRAN), a Next-Generation Core (NGC), 5G Core Network (5GC), or an internet), through a radio access network (RAN) established by the base station.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a personal digital assistant (PDA) with wireless communication capability. The UE is configured to receive and transmit signals over an air interface to one or more cells in a radio access network.

A base station may include, but is not limited to, a node B (NB) as in the UNITS, an evolved node B (eNB) as in the LTE-A, a radio network controller (RNC) as in the UMTS, a base station controller (BSC) as in the GSM/GERAN, an NG-eNB as in an E-UTRA base station in connection with the 5GC, a next generation node B (gNB) as in the 5G-RAN, and any other apparatus capable of controlling radio communication and managing radio resources within a cell. The base station may connect to serve the one or more UEs through a radio interface to the network.

A base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic wideband-code division multiple access (W-CDMA), high-speed packet access (HSPA), LTE, LTE-A, eLTE (evolved LTE), New Radio (NR, often referred to as 5G), and/or LTE-A Pro. However, the scope of the present disclosure should not be limited to the above mentioned protocols.

The base station is operable to provide radio coverage to a specific geographical area using a plurality of cells forming the radio access network. The base station supports the operations of the cells. Each cell is operable to provide services to at least one UE within radio coverage of the cell. More specifically, each cell (often referred to as a serving cell) provides services to serve one or more UEs within the cell's radio coverage, (e.g., each cell schedules the downlink and optionally uplink resources to at least one UE within the cell's radio coverage for downlink and optionally uplink packet transmissions). The base station can communicate with one or more UEs in the radio communication system through the plurality of cells. A cell may allocate sidelink (SL) resources for supporting proximity service (ProSe). Each cell may have overlapped coverage areas with other cells.

As discussed above, the frame structure for NR is to support flexible configurations for accommodating various next generation (e.g., 5G) communication requirements, such as enhanced mobile broadband (eMBB), massive machine type communication (mMTC), ultra reliable communication and low latency communication (URLLC), while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may be also used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in a NR frame to support ProSe services.

FIG. 1 is a schematic diagram illustrating multi-connectivity, dual-connectivity, and carrier aggregation Duplication operations, according to various aspects of the present disclosure. In the present implementation, the Packet Data Convergence Control (PDCP), Radio Link Control (RLC), and Medium Access Control (MAC) entities (e.g., layers) as shown in FIG. 1 may be within a transmitter of a UE or a network node (e.g., a base station). The PDCP PDU duplication may be utilized for DRBs and/or SRBs mapped on dedicated traffic channel (DTCH) and/or dedicated control channel (DCCH) types of logical channels. A duplication function in the PDCP layer of the transmitter may duplicate PDCP PDU packets where the duplicated PDCP PDU packets may be delivered to at least two radio bearers (e.g., split radio bearers) and the corresponding logical channels. The selected radio bearers may be in the same cell group or different cell groups. Also, the MAC entity of each cell group may multiplex the duplicated packets and put the duplicated packets onto multiple component carriers.

In diagram 100 of FIG. 1, when PDCP PDU Duplication is activated based on a specific event (e.g., an event-based Duplication activation), duplication function 108 in PDCP layer 106 may duplicate one or more PDCP PDU packets from an original PDCP PDU packet, and provide the duplicated PDCP PDU packets (including the original and duplicated PDCP PDU packets) to at least one additional RLC bearer, where each RLC bearer may compose the lower layer portion of the radio bearer configurations including the RLC layer and MAC layer (e.g., logical channel) configurations. In some implementations, a radio bearer may be configured with two or more logical channels. The PDCP PDU packets of one radio bearer may be delivered through one (pre-configured) RLC bearer when the duplication function of the corresponding radio bearer is de-activated and the pre-configured RLC bearer may be pre-configured to the UE by serving cells through dedicated control signaling. It should be noted that, a PDCP PDU packet may be duplicated to several PDCP PDU packets to one or more additional RLC bearers while the duplication function of the corresponding radio bearer is activated. In one implementation, as shown in FIG. 1, the duplicated PDCP PDU packets are sent to one or more RLC bearers (e.g., RLC bearers 112 and 114) in master cell group (MCG) 110, one or more RLC bearers (e.g., RLC bearers 122 and 124) in secondary cell group (SCG) 120, and/or one or more RLC bearers (e.g., RLC bearers 132 and 134) in another SCG 130. After multiplexing in the MAC layers of the corresponding MCG 110, SCG 120, and SCG 130, the PDCP PDU packets (e.g., having the original and duplicated PDCP PDU packets) are sent through multiple component carriers in the one or more cell groups (e.g., MCG 110, SCG 120, and SCG 130). These RLC bearers (e.g., RLC bearers 112, 114, 122, 124, 132, and 134) may be configured with the configuration of a DRB or a SRB.

In a CA PDCP PDU Duplication operation according to an example implementation of the present disclosure, the duplicated PDCP PDU packets (e.g., having the original and duplicated PDCP PDU packets) may be transmitted or received on component carriers in a single cell group of a network node (e.g., a master network node, such as a master eNB or gNB). For example, with reference to FIG. 1, the duplicated PDCP PDU packets may be transmitted or received on component carriers CC #j and CC #i through RLC bearers 112 and 114 of MCG 110.

In a DC PDCP PDU Duplication operation according to an example implementation of the present disclosure, the duplicated PDCP PDU packets (e.g., having the original and duplicated PDCP PDU packets) may be transmitted or received on component carriers in a master cell group of a master network node (e.g., a master eNB or gNB) and a secondary cell group of a secondary network node (e.g., a secondary eNB or gNB). For example, with reference to FIG. 1, one of the duplicated PDCP PDU packets may be transmitted or received on component carrier CC #j or CC #i through RLC bearer 112 or 114 of MCG 110, while the other one of the duplicated PDCP PDU packets may be transmitted or received on component carrier CC #b or CC #a through RLC bearer 122 or 124 of SCG 120. In another example, one of the duplicated PDCP PDU packets may be transmitted or received on component carrier CC #j or CC #i through RLC bearer 112 or 114 of MCG 110, while the other one of the duplicated PDCP PDU packets may be transmitted or received on component carrier CC #f or CC #e through RLC bearer 132 or 134 of SCG 130.

In an MC PDCP PDU Duplication operation according to an example implementation of the present disclosure, the duplicated PDCP PDU packets (e.g., having the original and duplicated PDCP PDU packets) may be transmitted or received on component carriers in a master cell group of a master network node (e.g., a master eNB or gNB) and two or more secondary cell groups of two or more secondary network nodes (e.g., secondary eNBs and/or gNBs). For example, with reference to FIG. 1, one of the PDCP PDU packets may be transmitted or received on component carrier CC #j or CC #i through RLC bearer 112 or 114 of MCG 110; another one of the duplicated PDCP PDU packets may be transmitted or received on component carrier CC #b or CC #a through RLC bearer 122 or 124 of SCG 120; yet another one of the duplicated PDCP PDU packets may be transmitted or received on component carrier CC #f or CC #e through RLC bearer 132 or 134 of SCG 130.

It should be understood that a DC PDCP PDU Duplication operation may be regarded as a special case of the MC PDCP PDU Duplication operation, where the MCG and only one SCG are configured for the UE. Also, the CA PDCP PDU Duplication operation may be regarded as another special case of the MC PDCP PDU Duplication operation, where only one cell group (e.g., the MCG) is configured for the UE.

In the CA PDCP PDU Duplication operation, a UE is configured with one primary component carrier (PCC) and at least one secondary component carrier (SCC). In addition, a PCell is a cell operating on the primary component carrier (PCC), while an SCell is a cell operating on a secondary component carrier (SCC). In the DC and MC PDCP PDU Duplication operations, in addition to PCell and SCell, a PSCell is an SCG cell is also configured, where the UE performs (DL/UL) synchronization and control signaling transmission/reception with the PSCell.

Some implementations of the present disclosure are directed to how the duplication function (e.g., duplication function 108) selects the radio bearers for Duplication. As shown in FIG. 1, there are at least 6 available RLC bearers to dispatch the duplicated PDCP PDU packets. The transmitter of the UE needs to select one or more RLC bearers to deliver them independently. To assist the transmitter in selecting radio bearers for Duplication, a base station (e.g., a serving base station) may provide dedicated signaling (e.g., an RRCConnectionReConfiguration message) to configure the RLC bearers and the corresponding logical channels to one radio bearer (e.g., DRB or SRB) of the UE for Duplication.

Some implementations of the present disclosure are directed to how each MAC entity decides the mapping between logical channel of each corresponding RLC bearer and configured component carriers (or serving cell corresponding to each configured component carrier) for Duplication, so that the duplicated PDCP PDU packets can be delivered to the receiver through the PCell of a MCG, the PSCell of an SCG, and/or the SCells of the MCG/SCG(s). For example, to achieve frequency diversity, the MAC entity of each cell group may follow mapping rules to prevent the duplicated PDCP PDU packets from being delivered on a single component carrier. In one implementation, a base station (e.g., a serving base station) may configure mapping rules between logical channels and serving cells for one or more UEs, and send the mapping configuration through explicit signaling (hereinafter also referred to "the Base Station Explicit Signaling approach") for the UEs to follow. In another implementation, the MAC entities in a UE responsible for each cell group may select and distribute the duplicated PDCP PDU packets to different component carriers (or serving cells) based on the UE's mapping rules (hereinafter also referred to "the UE Self-(re)selection approach").

Some implementations of the present disclosure are directed to determining what radio resources that the transmitter may apply in the component carriers for Duplication.

CASE 1: Mapping Configuration for Duplication

Figure 2:
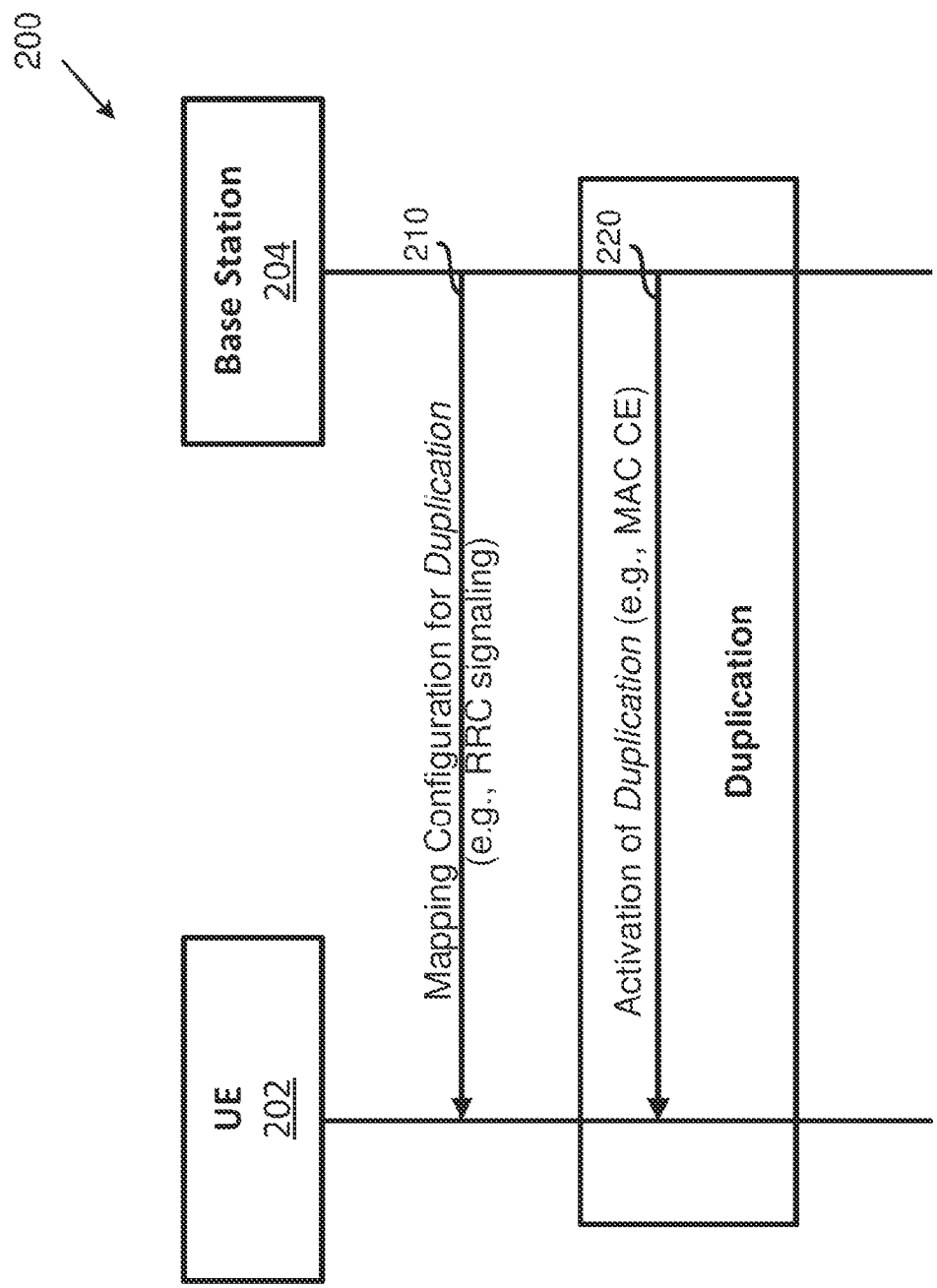
FIG. 2 is a diagram illustrating signaling for a mapping configuration for Duplication, in accordance with an example implementation of the present disclosure.

FIG. 2 is a diagram illustrating signaling for a mapping configuration for Duplication, in accordance with an example implementation of the present disclosure. In the present implementation, UE 202 may include a transmitter having PDCP, RLC, and MAC layers with DRB or SRB configurations, which are substantially similar to those shown in diagram 100 in FIG. 1.

In diagram 200, in action 210, base station 204 may send a mapping configuration for Duplication to UE 202 through dedicated signaling (e.g., RRC signaling). In the present implementation, base station 204 may configure a PCell and/or a PSCell and/or one or more SCells (of MCG and/or SCG(s)) for UE 202, and provide the mapping configuration for Duplication to UE 202. The mapping configuration for Duplication includes mapping rules, for at least one of the MAC entities of UE 202, between logical channels and serving cells to aid UE 202 in deciding and/or selecting operation cells (and component carriers) for transmitting or receiving duplicated PDCP PDU packets.

In the present implementation, the Duplication function may remain de-activated for UE 202 upon receiving the mapping configuration for Duplication from base station 204. Base station 204 may deliver an Activation of Duplication message (or an activation message of packet duplication) through dedicated signaling (e.g., by sending a MAC control element (CE)) to UE 202. UE 202 may then start Duplication after receiving the Activation of Duplication message. As shown in FIG. 2, in action 220, base station 204 may send an Activation of Duplication message to UE 202 to start/activate Duplication.

In some implementations, the mapping configuration may be configured by base station 204 for UE 202 to activate Duplication immediately upon receipt of the mapping configuration. For example, UE 202 may activate Duplication immediately upon receiving the mapping configuration from base station 204.

In some implementations, the mapping configuration may be configured by base station 204 to UE 202 for immediate Duplication activation and event-based re-selection of operation cell(s). For example, UE 202 may activate Duplication immediately upon receiving the mapping configuration from base station 204, and may re-select the operation cell(s) among the candidate cells configured by base station 204.

In some implementations, base station 204 may configure event-based activation triggers in the mapping configuration, such that UE 202 may decide to activate Duplication by itself based on one or more triggering events configured by base station 204.

For the CA PDCP PDU Duplication operation, base station 204 may provide sCellIndex(ices) (index(ices) provided by the radio access network (RAN) to represent SCell(s) of UE 202) that may be utilized for Duplication. For the CA PDCP PDU Duplication operation, in some implementations, base station 204 may indicate different SCells for DL and UL Duplication processes. For example, as shown in Table 1-1, base station 204 may indicate {sCellIndex #1, sCellIndex #4} for DL Duplication and {sCellIndex #3, sCellIndex #5, sCellIndex #6} for UL Duplication.

TABLE 1-1

Base station configuring different cells for DL and UL Duplications separately.

| Type | LCH <-> Operation Cell | |
| --- | --- | --- |
| DL Duplication | LCH#a | sCellIndex#1 |
| | LCH#b | sCellIndex#4 |
| UL Duplication | LCH#i | sCellIndex#3 |
| | LCH#k | sCellIndex#5 |
| | LCH#l | sCellIndex#6 |

For the CA PDCP PDU Duplication operation, in some implementations, base station 204 may indicate the same cells for DL and UL Duplication processes. As shown in Table 1-2, {sCellIndex #3, sCellIndex #3} are provided for both DL and UL Duplications.

TABLE 1-2

Base station configuring the same cells for DL and UL Duplications.

| Type | LCH <-> Operation Cell | |
| --- | --- | --- |
| DL and UL | LCH#a | sCellIndex#2 |
| Duplications | LCH#b | sCellIndex#3 |

For the CA PDCP PDU Duplication operation, in some implementations, a PCell may be utilized to deliver duplicated PDCP packets by default. Thus, base station 204 may only need to indicate the additional SCell for Duplication. In some implementations, base station 204 may need to indicate a PCell in the mapping configuration. The RAN may pre-define a PCell index (e.g., filling in all zeros in the index field) to represent the PCell. In some additional implementations, base station 204 may define another Cell index, called ServCellIndex. Base station 204 is to apply ServCellIndex to indicate at least one serving cell for the MAC entity (which is responsible to MCG or SCG) on the UE side to decide whether the pending packets of one logical channel is allowed to be transmitted on a UL grant of the corresponding serving Cell. ServCellIndex is an integer with a range from 0 to maxNrofServingCells-1, where the maxNrofServingCells is a pre-defined value (e.g., an integer) in technical specification to define the maximum number of serving cells which a UE can support (within a cell group). In addition, the value of 0 in ServCellIndex is applied to indicate the PCell in the MCG. Moreover, the value 1 to maxNrofServingCells-1 of ServCellIndex may have one-to-one mapping to the corresponding SCellIndex, as shown in Table 1-3. It is also noted that to a logical channel of SCG, the ServCellIndex=0 may be applied to indicate the PSCell in the SCG.

TABLE 1-3

Explicit approach to indicate that a PCell may be utilized for Duplication, where DL and UL Duplications may utilize the same cells.

| Type | LCH <-> Operation Cell | |
| --- | --- | --- |
| DL and UL | LCH#a | ServCellIndex(='0000' (PCell)) |
| Duplications | LCH#b | ServCellIndex(=sCellIndext#1) |

In some implementations, the RAN may configure a list of operation cells, which is called an operation cell group (OCG), to one logical channel. As shown in Table 1-4(a), each logical channel is configured with an OCG. For example, {sCellIndex #2, sCellIndex #i, sCellIndex #m} is the OCG for LCH #a, and {sCellIndex #3, sCellIndex #j} is the OCG for LCH #b. After receiving an OCG, the MAC entities of the transmitter side may take the duplicated PDCP PDU packets from one logical channel and deliver the PDCP PDU packets to the one or more cells in the OCG. In some other implementations, the sCellIndex in Table 1-4(a) may be replaced by ServCellIndex, as shown in Table 1-4(b).

TABLE 1-4(a)

LCH configured with an OCG (indicated by sCellIndex)

| Type | LCH <-> Operation Cell Group | | |
|---|---|---|---|
| Duplication | LCH#a | sCellIndex#2 sCellIndex#i sCellIndex#m | |
| | LCH#b | sCellIndex#3 sCellIndex#j N.A. | |

TABLE 1-4(b)

LCH configured with an OCG (indicated by ServCellIndex)

| Type | LCH <-> Operation Cell Group | | |
|---|---|---|---|
| Duplication | LCH#a | ServCellIndex #2 (=sCellIndex#2) | ServCellIndex #i (=sCellIndex#i) | ServCellIndex #m (=sCellIndex#m) |
| | LCH#b | ServCellIndex #3 (-sCellIndex#3) | ServCellIndex #j (=sCellIndex#j) | ServCellIndex#0 (='0000'(PCell)) |

In some implementations, base station 204 may configure and provide an OCG to UE 202, according to the Base Station Explicit Signaling approach, in the mapping configuration in action 210, and indicate which operation cell(s) in the OCG to use after the Activation of Duplication message. Thus, after receiving the Activation of Duplication message in action 220, UE 202 may transmit the pending packets in one logical channel by referring to the configured OCG each time UE 202 obtains a UL grant from each serving Cell. In some other implementations, in the Activation of Duplication message, base station 204 may use additional operation cell bits, where the details of operation cell bits are shown in Table 1-5, to implicitly indicate which operation cells can be utilized by UE 202 for Duplication.

As shown in Table 1-5, the cells in the OCG may be indexed based on their sequences in the OCG (e.g., in Table 1-5, sCellIndex #2 is the first cell; sCellIndex #i is the second cell; sCellIndex #m is the third cell). UE 202 may learn the indices and the corresponding cells in the OCG from the mapping configuration. Then, based on the indices for the cells, the operation cell bits may be provided in the Activation of Duplication message by base station 204 to UE 202, to indicate which cell(s) that UE 202 is allowed to use as operation cell(s).

TABLE 1-5

Operation cell bits provided to indicate which operation cells may be utilized by a UE based on the indices of operations cells in the OCG

| Operation Cell bits in Activation of Duplication message | Cell in OCG |
|---|---|
| 00 | sCellIndex#2 |
| 01 | sCellIndex#i |
| 10 | sCellIndex#m |

In some implementations, base station 204 may provide a mapping configuration, between the logical channels and operation cells explicitly, to UE 202. UE 202 may re-select the operation cell(s) based on pre-defined triggering events. UE 202 may select at least one operation cell from the OCG to deliver the duplicated packets. When a pre-defined triggering event occurs, UE 202 may re-select another operation cell in the same OCG to continue delivering the duplicated packets substantially without interruption.

It should be noted that in various implementations of the present disclosure, in each mapping configuration for Duplication, an operation cell may not be configured to more than one OCG to prevent the pending packets of different logical channels from being delivered on the same component carrier.

In one implementation, base station 204 may indicate the Duplication function of at least one radio bearer (e.g., DRB(s)) is activated by delivering the Activation of Duplication message to UE 202. Then, to each logical channel in which duplication is be activated, base station 204 may further configure the operation cell(s) by providing the operation cell bits for each logical channel in the Activation of Duplication message.

In Table 1-6, in an example Activation of Duplication message, base station 204 (e.g., a gNB) indicates which radio bearer(s) should activate the Duplication function in the PDCP layer and what logical channels that duplicated packets are delivering in RLC layer.

TABLE 1-6

Example Activation of Duplication message.

| Format | Content |
|---|---|
| Activation Bearer | DRB ID/SRB ID |
| Operation Cell of $1^{st}$ LCH | 01 |
| Operation Cell of $2^{nd}$ LCH | 10 |

Under the MC PDCP PDU Duplication operation, in one implementation, a master node (MN) may provide a mapping configuration to a UE, where the mapping configuration includes mapping rules between the logical channels and operation cells of the MCG and/or SCGs. Before the MN delivers the mapping configuration to the UE, the MN may coordinate with one or more secondary nodes (SNs) through backhaul, where the SNs may each provide their operation cells or OCG for Duplication. The MN may then forward the mapping configuration between the UE and the SNs.

For the MC PDCP PDU Duplication operation, in one implementation, UE 202 may be configured with a MCG and two or more SCGs (e.g., MCG 110, SCG 120, and SCG 130 in FIG. 1), where a master node is in charge of the PCell and SCell(s) in the MCG, a secondary node is in charge of the PSCell and SCell(s) in first SCG (e.g., SCG #1), and another secondary node is in charge of the PSCell and SCell(s) in the second SCG (e.g., SCG #2).

Figure 3A:
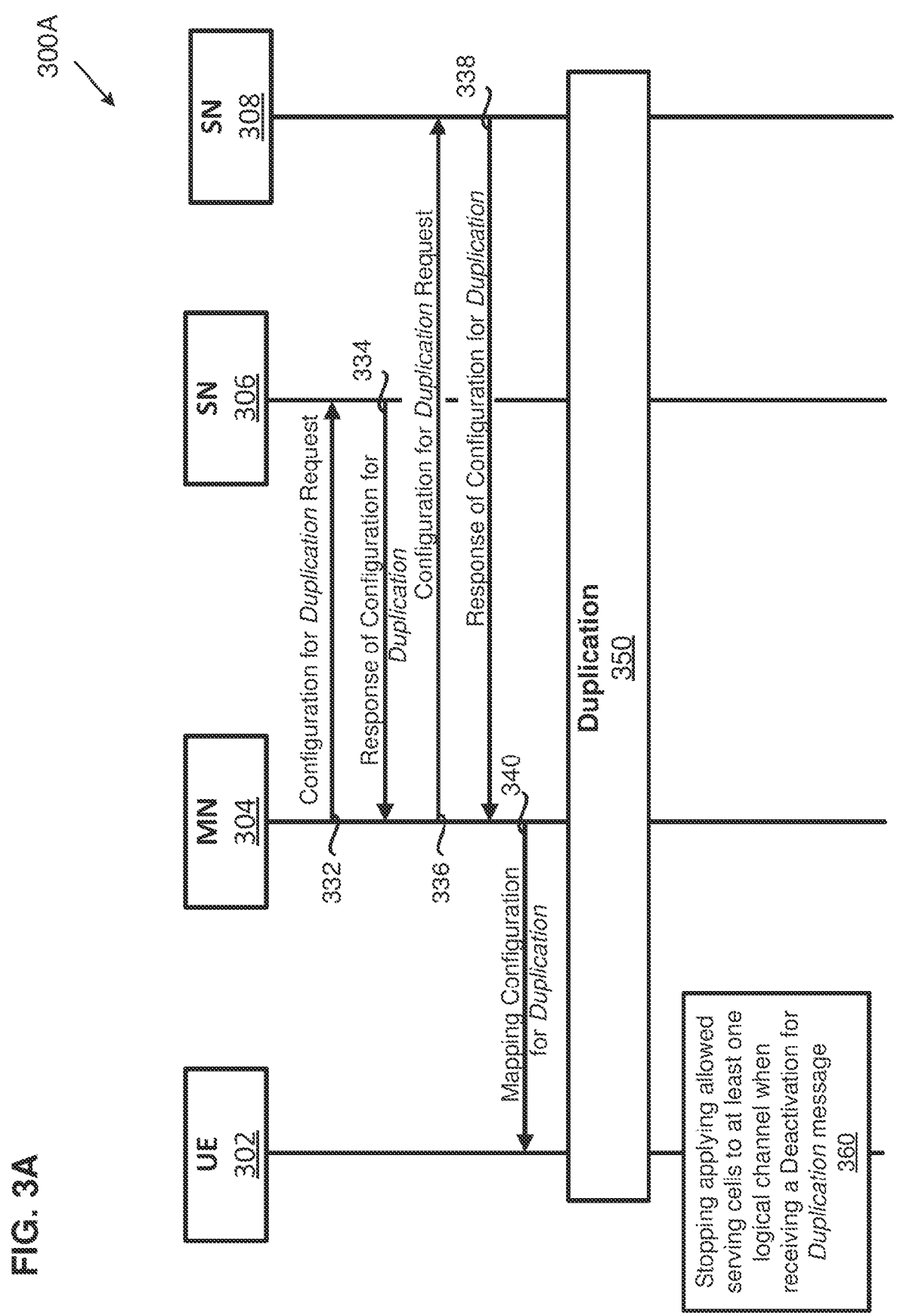
FIG. 3A is a diagram illustrating a master node providing a mapping configuration for Duplication to a UE, where the mapping configuration includes mapping rules for MCG and SCGs, in accordance with an example implementation of the present disclosure.

FIG. 3A is a diagram illustrating a master node providing a mapping configuration for Duplication to a UE, where the mapping configuration includes mapping rules for MCG and SCGs, in accordance with one example implementation of the present disclosure. As illustrated in diagram 300A, in action 332, MN 304 may send a Configuration for Duplication request to SN 306 for operation cell(s) or OCG for Duplication from SN 306. In action 334, SN 306 may provide its operation cell(s) or OCG for Duplication to MN 304. In action 336, MN 304 may send a Configuration for Duplication request to SN 308 for operation cell(s) or OCG for Duplication from SN 308. In action 338, SN 308 may provide its operation cell(s) or OCG for Duplication to MN 304. In action 340, MN 304 may provide a mapping configuration for Duplication to UE 302, where the mapping configuration includes mapping rules between the logical channels and operation cells (or OCGs) of all of the MCG and SCGs from MN 304, SN 306, and SN 308.

In action 350, UE 302 may activate Duplication after receiving an Activation of Duplication message from MN 304, for example. In some implementations, the RAN may not immediately activate Duplication after delivering the Activation of Duplication message to UE 302.

In action 360, UE 302 may stop applying one or more of the allowed serving cells to the one or more logical channels when receiving a Deactivation for Duplication message (or a deactivation message of packet duplication).

Table 2-1(a) shows an example mapping configuration format for Duplication in action 340, when MN 340 provides the mapping configuration to UE 302. The mapping configuration includes mapping rules between the logical channels and operation cells of all of the MCG and SCGs.

TABLE 2-1(a)

MN providing CG indices and SCellindices in a mapping configuration

LCH <-> Operation Cell in MC scenario

| Type | CG index | LCH | Cell index |
| --- | --- | --- | --- |
| DL Duplication | MCG index | LCH#a | sCellIndex#1 |
|  | SCG#1 index | LCH#b | sCellIndex#2 |
|  | SCG#2 index | LCH#c | sCellIndex#3 |
| UL Duplication | MCG index | LCH#m | "0000"(PCell) |
|  | SCG#1 index | LCH#n | sCellIndex#1 |

As shown in Table 2-1(a), MN 304 may provide different mapping configurations for DL Duplication and UL Duplication across different cell groups. In addition, MN 304 may provide cell group (CG) indices to MCG, SCG #1, SCG #2 (e.g., {MCG index, SCG #1 index, SCG #2 index}), so UE 304 may identify the cell groups based on the CG indices in Table 2-1(a). The RAN may provide the CG indices to UE 302 through RRC signaling before MN 304 providing the mapping configuration to UE 302. In some implementations, default cell(s) (e.g., PCell in MCG or PSCell in SCG) may be configured in technical specifications or by the serving base station (e.g., a gNB) for Duplication. In such cases, the RAN may only provide indication of the remaining cells for Duplication. Otherwise, the RAN may also need to provide indication of PCell in MCG and/or PSCell in SCG in the mapping configuration, as shown in Table 2-1(a).

In some implementations, the format for mapping configuration for Duplication in action 340 may be provided through the proposed ServCellIndex, as shown in Table 2-1(b).

TABLE 2-1(b)

MN providing ServCellIndices in a mapping configuration

| Radio Bearer | LCH <-> Operation Cell in MC scenario for DRB#0 | | |
| --- | --- | --- | --- |
|  | CG index | LCH | Cell index |
| DRB ID#0 | MCG index | LCH#a | ServCellIndex#1 (=sCellIndex#1) |
|  | SCG#1 index | LCH#b | ServCellIndex#2 (=sCellIndex#2) |
|  | SCG#2 index | LCH#c | ServCellIndex#0 (="0000"(PSCell)) |

In some implementations, PCell and/or PSCell may be the default cells to deliver duplicated PDCP packets. Thus, UE 302 may only need to know the SCG indices for Duplication. As shown in Table 2-2, MN 304 may provide the CG indices which are involved in the DL and/or UL Duplication operations, and UE 302 may know which PCell and/or PSCell of the involved CGs are to be utilized for Duplication.

TABLE 2-2

MN only providing CG indices in a mapping configuration.

| | LCH <-> Selected CG | |
| --- | --- | --- |
| Type | (PCell/PSCell is the default cell) | |
| DL Duplication | MCG index | LCH#a |
|  | SCG index#1 | LCH#b |
| UL Duplication | MCG index | LCH#m |
|  | SCG#1 index | LCH#n |
|  | SCG#2 index | LCH#l |

Under the MC PDCP PDU Duplication operation, in one implementation, the RAN may provide multiple candidates across multiple CGs. As shown in Table 2-3, the RAN may configure multiple mapping rules between logical channels and operation cells for MC PDCP PDU Duplication. In the implementation shown in Table 2-3, a UE may only select a number of logical channels (and the corresponding cells) for Duplication. For example, in Table 2-3, three logical channels and the corresponding cells are configured in the candidate lists for UL Duplication. With reference to FIG. 3A, MN 304 may determine and/or configure the number of logical channels that UE 302 is allowed to select from the list. For example, UE 302 may select any two of the three logical channels (e.g., LCH #a, LCH #b, and LCH #c in Table 2-3) and the corresponding cells (e.g., sCellIndex #1 of MCG, sCellIndex #2 of SCG #1, and sCellIndex #3 of SCG #2 in Table 2-3) or an OCG listed in Table 2-4. In some implementations, the number of duplicated logical channels may have a default value specified in technical specification.

TABLE 2-3

Multiple candidates across multiple CGs in the MC PDCP PDU Duplication operation

| | LCH <-> Operation Cell in MC scenario | | |
| --- | --- | --- | --- |
| Type | CG index | LCH | Cell index |
| UL Duplication | MCG index | LCH#a | sCellIndex#1 |
|  | SCG#1 index | LCH#b | sCellIndex#2 |
|  | SCG#2 index | LCH#c | sCellIndex#3 |
| Number of duplicated logical channel | | | 2 |

In some implementations, an OCG may be represented by a CG index (e.g., an MCG index or an SCG index), which means that all of the cells in the CG are included in the OCG.

As shown in Table 2-4, a MCG index may be provided to LCH #m, which means that the OCG of LCH #m covers the PCell and SCells of the MCG. An SCG #1 index may be provided to LCH #n, which means that the OCG of LCH #n covers the PSCell and SCells of the SCG #1. An SCG #2 index may be provided to LCH #1, which means that the OCG of LCH #1 covers the PSCell and SCells of the SCG #2.

TABLE 2-4

The OCG of each LCH being provided through a CG index.

| Type | LCH | <-> OCG |
|---|---|---|
| UL Duplication | LCH#m | MCG index |
| | LCH#n | SCG#1 index |
| | LCH#1 | SCG#2 index |

In some implementations, MN 304 may provide or indicate the allowed operation cell(s) of the logical channels in the Activation of Duplication message (e.g., as referred to in Table 1-6). In some implementations, MN 304 may provide or indicate the allowed operation cell(s) by providing the CG index(ices) and/or cell index(ices) in the Activation of Duplication message. The RAN may provide the CG index of each corresponding CG to UE 302 through dedicated signaling (e.g., RRC signaling), as shown in Table 2-5.

TABLE 2-5

RAN providing the CG index of each CG to a UE through dedicated signaling.

| Configured CG to a UE | CG index |
|---|---|
| MCG | 00 |
| 1$^{st}$ SCG | 01 |
| 2$^{nd}$ SCG | 10 |

Under the MC PDCP PDU Duplication operation, in another implementation, an MN and two or more SNs may each directly provide a mapping configuration for Duplication to a UE for the corresponding MCG and SCGs.

FIG. 3B is a diagram illustrating a master node and two or more secondary nodes each providing a mapping configuration for Duplication to a UE, in accordance with one example implementation of the present disclosure. As illustrated in diagram 300B, in action 331, MN 304 may send a message to SN 306 (e.g., a request for Configuration for Duplication in SCG #1), through a backhaul connection, to request SN 306 to provide a mapping configuration for Duplication in SCG #1 to UE 302. In action 333, MN 304 may send a message (e.g., a request for Configuration for Duplication in SCG #2) to SN 308, through a backhaul connection, to request SN 308 to provide a mapping configuration for Duplication in SCG #2 to UE 302. In action 335, MN 304 may configure the operation cells (e.g., PCell and/or SCell(s)) in the MCG, and provide the mapping configuration for Duplication in the MCG to UE 302. In action 337, SN 306 may configure the operation cells (e.g., PSCell and/or SCell(s)) in SCG #1, and provide the mapping configuration for Duplication in SCG #1 to UE 302. In action 339, SN 308 may configure the operation cells (e.g., PSCell and/or SCell(s)) in SCG #2, and provide the mapping configuration for Duplication in SCG #2 to UE 302. In action 350, UE 302 may activate Duplication after receiving an Activation of Duplication message from MN 304, for example. In some implementations, the RAN may not immediately activate Duplication after delivering the Activation of Duplication message to UE 302. In action 360, UE 302 may stop applying one or more of the allowed serving cells to the one or more logical channels when receiving a Deactivation for Duplication message (or a deactivation message of packet duplication).

In the present implementation, since MN 304, SN 306 and SN 308 may each provide a mapping configuration by themselves, the format of each mapping configuration for Duplication may follow those described with respect to the CA PDCP PDU Duplication operation, as shown in Table 1-1 through Table 1-4(b).

In some implementations, UE 302 may select logical channels and the corresponding operation cells for Duplication. For the multiple candidates across multiple CGs configuration, all the mapping configurations from multiple CGs for Duplication are combined as one OCG to UE 302. In addition, the number of duplicated logical channels for Duplication may be configured to UE 302 explicitly (e.g., through explicit signaling) or implicitly (e.g., by a default value in technical specification). Based on the list of configured candidates across multiple CGs, UE 302 may select a certain number of allowed logical channels and the corresponding operation cells for Duplication. In some implementations, UE 302 may re-select another logical channel(s) and the corresponding operation cell(s) from the list of allowed logical channels and the corresponding operation cells to deliver the duplicated PDCP PDU packets based on one or more pre-defined triggering events, which are described with reference to the Event-based UE Self-(re)selection approaches herein.

Under the MC PDCP PDU Duplication operation, in another implementation, an MN and two or more SNs may each directly provide a mapping configuration for Duplication to a UE for the corresponding MCG and SCGs.

Figure 3C:
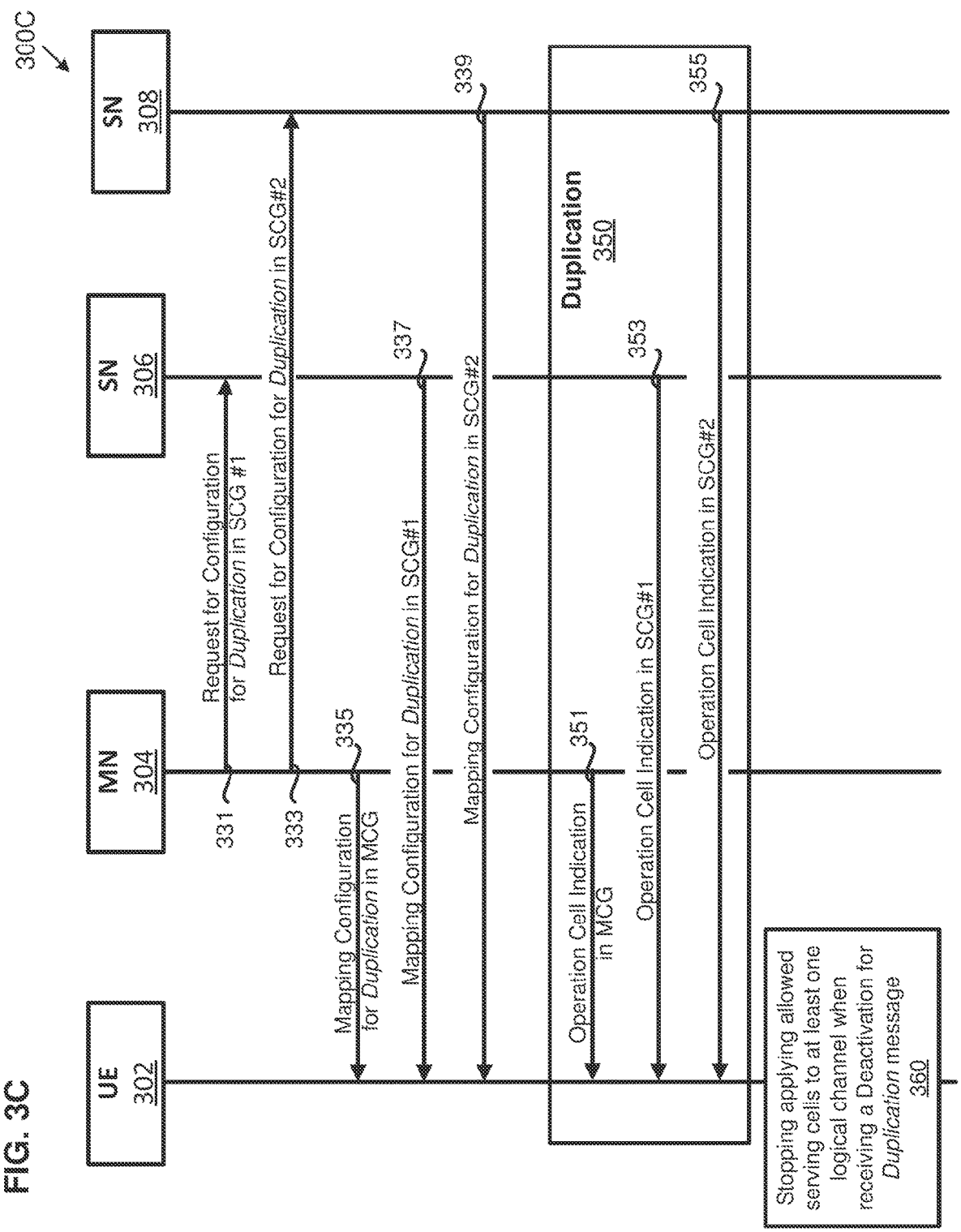
FIG. 3C is a diagram illustrating a master node and two or more secondary nodes each providing an operation cell indication for Duplication to a UE, in accordance with an example implementation of the present disclosure.

FIG. 3C is a diagram illustrating a master node and two or more secondary nodes each providing an operation cell indication for Duplication to a UE, in accordance with one example implementation of the present disclosure.

As illustrated in diagram 300C, actions 331, 333, 335, 337, and 339 may be substantially similar to actions 331, 333, 335, 337, and 339, respectively, in FIG. 3B. In FIG. 3C, the RAN (e.g., having MN 304, SN 306, and SN 308) may further indicate the operation cell(s) through dedicated signaling (e.g., MAC CEs). In some implementations, MN 304, SN 306, and SN 308 may each indicate their operation cell(s) of the logical channel(s) in their respective Activation of Duplication messages (e.g., as shown in Table 1-6). As shown in diagram 300C, during Duplication 350, in action 351, in an Activation of Duplication message, MN 304 may provide an indication of allowed operation cell(s) (e.g., PCell and SCell(s)) in MCG to UE 302. In action 353, in an Activation of Duplication message, SN 306 may provide an indication of allowed operation cell(s) (e.g., PSCell and SCell(s)) in SCG #1 to UE 302. In action 355, in an Activation of Duplication message, SN 308 may provide an indication of allowed operation cell(s) (e.g., PSCell and SCell(s)) in SCG #2 to UE 302. In some other implementations, the operation cell(s) corresponding to one LCH may be indicated by CG index(ices) and/or cell index(ices). In action 360, UE 302 may stop applying one or more of the allowed serving cells to the one or more logical channels when receiving a Deactivation for Duplication message (or a deactivation message of packet duplication).

As discussed above, in various implementations of the present disclosure, the Base Station Explicit Signaling approach, the UE Self-(re)selection approach, or a hybrid combination of both may be applicable to Duplication. In addition, a base station (e.g., gNB) may configure and/or determine which of these approaches is suitable for Duplication for the UE.

In Table 3, three examples are provided showing in mapping configurations for Duplication that a base station may provide to a UE.

TABLE 3

Mapping Configurations for Duplication

| Event | Mapping Configuration for Duplication |
|---|---|
| Implementation #X1 | Base Station Explicit Signaling approach only. Base station (e.g., gNB) may indicate which cells/CCs are the operation cell(s) for Duplication after the Duplication is activated. |
| Implementation #X2 | (1) RAN may activate Duplication without indicating the operation cells to UE. (2) Event-based UE Self-(re)selection approach only. UE may (re)select operation cell(s) when at least one triggering event is fulfilled. (3) RAN may provide candidate cells for UE to select the Operation Cells and so UE may select the operation cell(s) from the group of candidate cells. |
| Implementation #X3 | (1) Base Station Explicit Signaling approach only, by default. UE may implement Duplication based on the mapping configuration provided by gNB. (2) Triggering events for the UE Self-(re)selection approach are also provided. UE may apply the UE Self-(re)selection approach when at least one triggering event is fulfilled. (3) RAN may provide candidate cells for UE to select the operation cell(s). |

In Implementation #X1, an MN may provide the mapping configuration to the UE through the Base Station Explicit Signaling approach based on the CA PDCP PDU Duplication operation and the MC PDCP PDU Duplication operation. In Implementation #X2, an MN may indicate the Event-based UE Self-(re)selection approach, an example of a hybrid combination of the Base Station Explicit Signaling approach and the UE Self-(re)selection approach, to the UE for UL Duplication, for example. In the Event-based UE Self-(re)selection approach, one or more pre-defined triggering events are provided to the UE through the mapping configuration. Then, the UE may choose the mapped cells by itself when at least one triggering event is fulfilled. In Implementation #X3, both the Base Station Explicit Signaling approach and the UE Self-(re)selection approach are configured to the UE. The UE may apply the Base Station Explicit Signaling approach by default after receiving the mapping configuration from the RAN. In some implementations, the MN may configure an OCG for the UE to choose among the operation cell(s) in the configured OCG for Duplication. Also, the triggering event(s) of the Event-based UE S elf-(re)selection approach may be decided by each logical channel and/or each operation cell. As such, the re-selection of each operation cell may be implemented independently.

Figure 4:
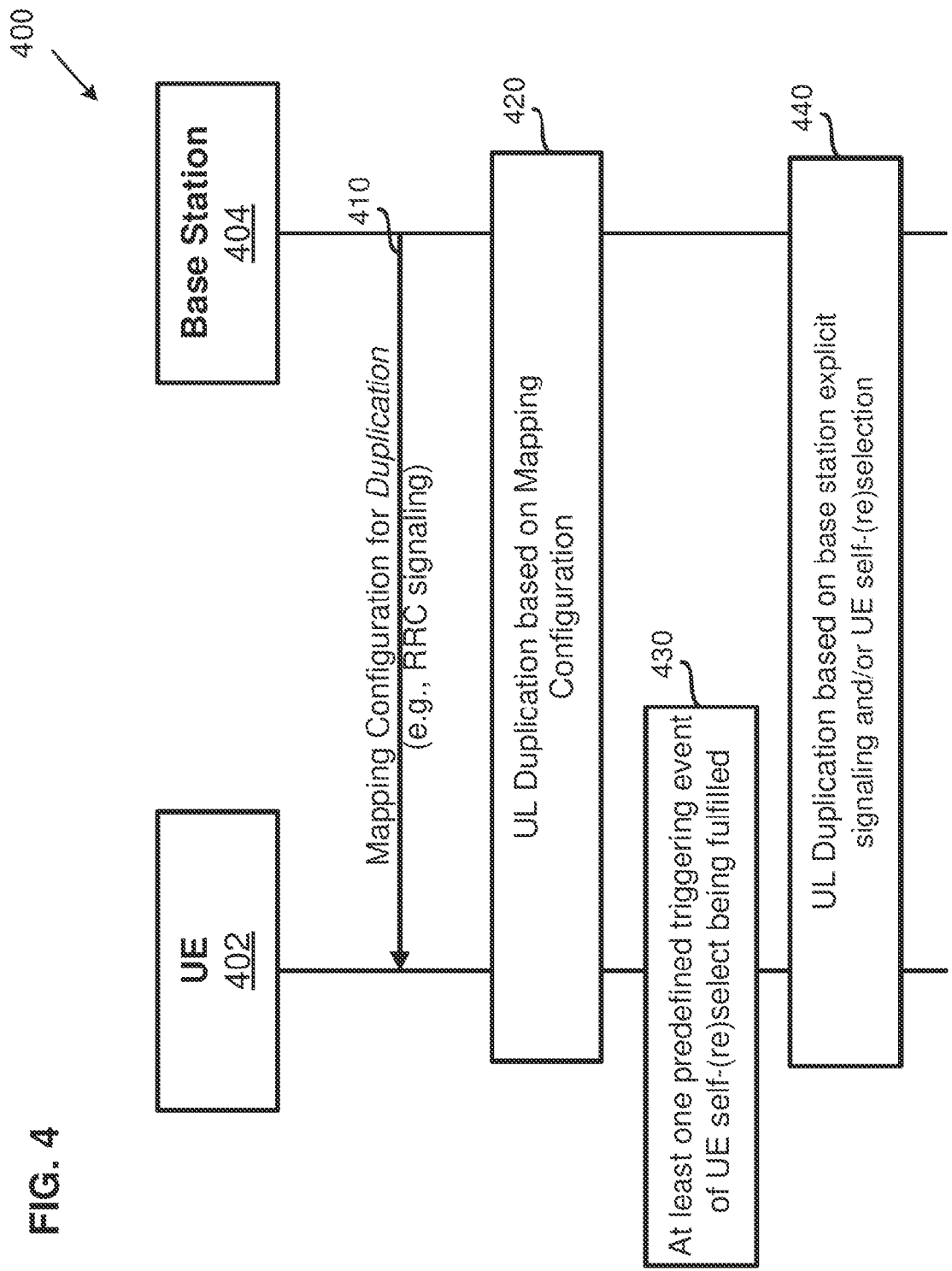
FIG. 4 is a diagram showing Implementation #X3 in Table 3, in accordance with an example implementation of the present disclosure.

FIG. 4 is a diagram showing Implementation #X3 according to an implementation of the present disclosure. As illustrated in diagram 400, in action 410, base station 404 (e.g., gNB) may configure the options (e.g., the Base Station Explicit Signaling approach (as default) and the Event-based UE Self-(re)selection approach) in the mapping configuration for Duplication, and send the mapping configuration for Duplication to UE 402. In action 420, UE 402 may determine or identify the operation cell(s) based on the Base Station Explicit Signaling approach. In action 430, at least one triggering event of at least one operation cell is fulfilled. In action 440, UE 402 may (re)select another operation cell to replace the operation cell(s).

The Event-based UE Self-(re)selection approach is discussed in detail below. Also, different options may be applied to DL Duplication and UL Duplication independently (e.g., the Base Station Explicit Signaling approach may be applied to DL Duplication, while the UE Self-(re) selection approach may be applied to UL Duplication). Also, in some implementations, the RAN may indicate operation cell(s) through the Base Station Explicit Signaling approach periodically. In addition, the periodicity that the RAN delivers the operation cell(s) may also be configured and provided to the UE, so that the UE may know when to receive and update the operation cell(s) for Duplication based on the periodicity.

With reference to FIG. 4, base station 404 (e.g., serving MN and/or SNs) may provide triggering events to UE 402 in the mapping configuration for Duplication, where the triggering events may activate UE Self-(re)selection of operation cell(s) in the Event-based UE Self-(re)selection approach. Table 4-1 includes some of the example triggering events according to some implementations of the present disclosure.

TABLE 4-1

Example implementations of the triggering events for event-based UE self-(re)selection

| | Triggering event for UE Self-(re)selection | UE's Behavior |
|---|---|---|
| Event #Y1 | The signaling quality of one Cell (e.g., Cell#Y1) of UL Duplication is worse than a pre-defined threshold (a.k.a. $T_{Y1}$). | (1) UE stops delivering duplicated PDCP PDUs on Cell#Y1 and then re-selects another available cell by itself. |
| Event #Y1-A | The Number of NACK response to UE on one Cell (e.g., Cell#Y1) within the moving time window (time span = $P_{NACK\_L4}$) is larger than $N_{NACK\_L4}$. | (1) UE stops delivering duplicated PDCP PDUs on Cell#Y1 and then re-selects another available cell by itself. |
| Event #Y2 | The amount of pending packets in one logical channel (e.g., LC #Y2) is higher than a pre-defined threshold ($T_{Y2}$). (Note: LC#Y2 is correspondent to Cell#Y2) | (1) UE stops delivering packets on Cell#Y2 and re-selects another available cell by itself. |

TABLE 4-1-continued

Example implementations of the triggering events
for event-based UE self-(re)selection

| | Triggering event for UE Self-(re)selection | UE's Behavior |
|---|---|---|
| Event #Y3 | One configured cell (e.g., Cell#Y3) is de-activated and RAN does not configure another cell for the UE to deliver duplicated PDCP PDUs. | (1) UE stops delivering duplicated packets on Cell#Y3.<br>(2) UE replaces Cell#Y3 to the PCell (if Cell#Y3 is in MCG) or PSCell (if Cell #Y3 is in an SCG) for UL Duplication (and PCell/PScell would not be de-activated in the present implementations). |
| Event #Y4 | Link problem (e.g., Radio link failure) of the PSCell of the SCG, which is at least one Cell is configured for UL Duplication. | (1) UE stops delivering duplicated packets on the SCG<br>(2) Then, UE is to re-select another available CG, split radio bearer, and the corresponding Operation Cell, by itself. |

As shown in Table 4-1, Event #Y1 is related to the channel quality (e.g., the RSRP (Reference Signal Receiving Power) or RSRQ (Reference Signal Receiving Quality) or RSSI (Received Signal Strength Indicator) value, which the UE obtains by measuring the reference signals delivered by the serving cell corresponding to the component carrier) of the operation cell(s). With regard to Event #Y1, while the UE is delivering duplicated PDCP packets in Cell #Y1, the UE may detect that the signaling quality of Cell #Y1 is worse than a pre-defined threshold (e.g., $T_{Y1}$). When Event #Y1 is fulfilled, the UE may stop delivering the duplicated PDCP packets on Cell #Y1. Instead, the UE may re-select another operation cell automatically for UL Duplication, for example.

Event #Y1-A (NACK Response on the Operation Cell):

As shown in Table 4-1, Event #Y1-A is related to a NACK response on the operation cell. With regard to Event #Y1-A, while the UE is delivering duplicated PDCP packets in Cell #Y1, the UE may detect or observe an acknowledgement/non-acknowledgement (ACK/NACK) response (e.g., a hybrid automatic repeat request response (HARD) ACK/NACK) from the RAN for previous UL packet deliveries. For example, the number of NACK responses from the RAN in one operation cell may be regarded as an indicator for the UE to trigger operation cell reselection. In Event #Y1-A, the RAN may further indicate the $\{N_{NACK\_1A}, P_{NACK\_1A}\}$ to the UE. The UE may monitor the ACK/NACK responses of UL packets delivered on the operation cell(s). The UE may set a moving time window, where the time span=$P_{NACK\_1A}$, in time domain (e.g., 100 ms or 50 subframes). The moving time window is moved forward in time domain with the advance of UL packet delivering on the operation cell. Then, Event #Y1-A may be triggered when the UE notices the total number of NACK responses in the moving time window is larger than $N_{NACK\_1A}$. When Event #Y1-A is fulfilled, the UE may stop delivering packets on Cell #Y1 and (re)select another operation cell.

As shown in Table 4-1, Event #Y2 is related to the buffer status of the logical channel. With regard to Event #Y2, the UE is delivering duplicated PDCP packets in Cell #Y2, where Cell #Y2 may be decided by the Base Station Explicit Signaling and/or the Event-based UE Self-(re)selection approach, and one logical channel (e.g., LC #Y2) is configured to map to Cell #Y2 for UL Duplication. In Event #Y2, the triggering event is the number of pending packets in LC #Y2 is higher than a pre-defined threshold (e.g., $T_{Y2}$). When Event #Y2 is fulfilled, the UE may stop delivering packets on Cell #Y2 and (re)select another operation cell.

As shown in Table 4-1, Event #Y3 is related to deactivation by the RAN. With regard to Event #Y3, the UE is delivering duplicated PDCP packets in Cell #Y3, where Cell #Y3 may be decided by the Base Station Explicit Signaling and/or the Event-based UE Self-(re)selection approach. In Event #Y3, the triggering event is that Cell #Y3 is de-activated, and the RAN does not configure another cell for the UE to deliver the duplicated PDCP PDU packets. In this situation, the UE may stop delivering the duplicated packets on Cell #Y3, and decide a new operation cell by itself because the RAN does not configure a new operation cell for the UE.

As shown in Table 4-1, Event #Y4 is related to a radio link problem (e.g., failure) of a PSCell of an SCG. With regard to Event #Y4, one RLC bearer in SCG (e.g., SCG #1 and one corresponding RLC bearer SCell #k in SCG #1) may be configured for Duplication. Then, Event #Y4 is fulfilled when the radio link of the PSCell in SCG #1 fails. When Event #Y4 occurs, SCell #k may also be terminated by the radio link problem of the PSCell of SCG #1. Thus, the UE may need to move the duplicated packets, which are going to be dispatched to the SCG, to another CG. In this condition, the UE may need to decide the corresponding CG, RLC bearer, and the corresponding operation cell(s) on its own.

TABLE 4-2

Example thresholds for
Event-based UE Self-(re)selection

| Threshold | Definition | Unit |
|---|---|---|
| $T_{Y1}$ | Threshold for DL link signal quality (e.g., RSRP, RSRQ, RSSI) | dB or dBm |
| $T_{Y2}$ | Threshold of the amount of data pending in the logical channel | Byte(s) |
| $P_{NACK\_1A}$ | Time span of the moving time window in Event#Y1-A | Subframe(s) or millisecond(s) |

TABLE 4-2-continued

Example thresholds for
Event-based UE Self-(re)selection

| Threshold | Definition | Unit |
| --- | --- | --- |
| $N_{NACK\_1A}$ | Threshold for the accumulated number of NACK responses in the moving time window in Event#Y1-A | Integer value |

Table 4-3 shows example operation cell criteria for a UE to (re)select a new operation cell (e.g., to replace the "original" operation cell).

TABLE 4-3

Example operation cell (re)selection criteria for UE

| | Operation Cell Selection (Re-selection) Criteria for UE |
| --- | --- |
| Level #1 CG | C#1-1 UE selects the same CG with original Operation Cell<br>C#1-2 UE selects different CG with original Operation Cell<br>C#1-3 Default CG (e.g., MCG)<br>C#1-4 UE autonomous selection |
| Level #2 Cell | C#2-1 UE decides based on signal strength (e.g., RSRP, RSRQ, RSSI) among cells.<br>C#2-2 UE decides based on channel occupancy ratio of shared radio resource by UEs among Cells<br>C#2-3 UE decides based on the buffer status of logical channel<br>C#2-4 Default Cell (e.g., PCell in MCG/PSCell(s) in SCG(s))<br>C#2-5 UE autonomous selection |

The selection process may be divided into two levels, where the first level may be CG level (Level #1 selection), and the second level may be cell level (Level #2 selection).

In Level #1 selection, the RAN may configure the UE to select a new operation cell on the same CG as the original operation cell (C #1-1). In one implementation, the RAN may configure a default CG (e.g., MCG) for the UE to re-select the new operation cell (C #1-3). In another implementation, the RAN may configure the UE to select a new operation cell on another CG (C #1-2), which is different than the CG of the original operation cell. In another implementation, the UE may decide/determine to select a CG by itself (C #1-4).

In Level #2 selection, the UE may decide a new operation cell based on: (1) received signal strength (e.g., RSRP, RSRQ, RSSI) of the cells (e.g., C #2-1) on the UE side; (2) channel occupancy ratio of shared radio resource in the cells (e.g., C #2-2). In some implementations, the UE estimates the channel occupancy ratio of one operation cell by evaluating the radio resource (e.g., Physical Resource Blocks) shared among UEs in the operation cell to transmit uplink packets (e.g., duplicate packets in uplink). The UE is to monitor the received signal strength of these shared PRBs, where one PRB is regarded as occupied if the received signal strength on the PRB is higher than (or equal to) a pre-defined threshold of signal strength (in dB or dBm). By contrast, one PRB is regarded as un-occupied if the received signal strength on the PRB is not higher than the pre-defined threshold. The UE is to evaluate the channel occupancy ratio of one operation cell by calculating the number of occupied PRBs in the shared PRBs over the total number of shared PRBs. Then, the UE is to decide to re-select the operation cell if the channel occupancy ratio of the shared PRB in one operation cell is higher than a pre-defined channel occupancy ratio threshold, wherein the channel occupancy ratio threshold is a fraction between 0 and 1; (3) buffering status of the logical channels associated with the cells (e.g., C #2-3). In some implementations, a default cell (e.g., PCell in MCG/PSCell(s) in SCG(s)) may be configured for the UE to select a new operation cell (e.g., C #2-4). It is also possible that the UE may select a new operation cell by considering any combination of C #2-1 through C #2-4. Also, in some implementations, the UE may select a new operation cell based on its own autonomous selection (e.g., C #2-5).

In some implementations, the RAN may limit the candidate CGs/Cells to the UE when UE Self-(re)selection is configured with Base Station Explicit Signaling. Based on the CA and MC PDCP PDU Duplication operations, the UE may select the operation cell(s) based on a given OCG or given multiple candidates across multiple CGs.

In some implementations, the RAN may send feedback responses to instruct the UE to re-select an operation cell for Duplication. In some implementations, the serving base station may not configure any mapping for Duplication, such that the UE may need to select the appropriate cells for duplicated packets transmission (here the appropriate one shall also take the constraint that same packets may not be put into the uplink grants of the same Cell for packet transmissions). When the serving base station receives the duplicated PDCP PDU packets, the serving base station may evaluate and determine whether reliability requirement of the radio bearer (DRB or SRB) is achieved. If such self-selection/mapping does not meet the target (e.g., target block error rate), the serving base station may send a feedback response to UE to change the current selection/mapping. The RAN feedback response may be accomplished by transmitting an RRC message or MAC Control Element (CE), or by a PDCP control PDU. It is also noted the indication is on a per-radio bearer basis such that the serving base station may reflect the un-satisfied situations to each DRB/SRB separately. When the UE receives the indications, the UE may change the path for Duplication. In addition, if the serving base station identifies reliability requirement (of the corresponding radio bearer) is still not fulfilled after sending the feedback response to the UE, the serving base station may de-activate (or de-configure) Duplication and then seek other possible solutions (e.g., using Repetition of TBs in the physical layer) to improve quality of service of the radio bearer.

CASE 2: Activation/Deactivation of PCell, PSCell, and SCells

For the purpose of power saving, in LTE systems, a base station (e.g., an eNB) may instruct a UE to de-activate SCell(s) after the UE is configured with SCell(s) in CA and DC operations. The UE does not need to perform the following actions on a de-activated SCell: (i) delivering sounding reference signal(s); (ii) providing measurement reports (e.g., Channel quality Indicator (CQI), Precoding Matrix Indicator (PMI), Rank Indicator (RI)) about the de-activated SCell; (iii) blind decoding of control channels of the de-activated SCell or data reception.

In the LTE systems, there are several ways for a UE to activate and deactivate the SCell(s). For example, a base station may instruct the UE to activate or deactivate the SCell(s) using a MAC CE. In another example, a base station may configure a Deactivation Timer (sCellDeactivationTimer) to the UE. The UE may set a Deactivation Timer to each SCell. The UE may set the Deactivation Timer of each SCell to equal to sCellDeactivationTimer after the corresponding SCell is activated. During packet exchange, the UE may restart the Deactivation Timer=sCellDeactivationTimer every time after the UE obtains a UL grant or a DL assignment for the activated SCell. Otherwise, the UE may de-activate the SCell automatically after the De-activation Timer of the corresponding SCell expires. In some implementations, the UE may consider sCellDeactivationTimer=infinity if the RAN does not configure an sCellDeactivationTimer to the UE. Also, when an sCellDeactivationTimer is configured to a UE, the RAN may also start counting a Deactivation Timer of each SCell to the UE. Then, the RAN may consider an SCell is de-activated if the Deactivation Timer of the SCell expires. As such, the RAN would not provide control signaling to the UE on the deactivated SCell. In yet another example, all SCells may be deactivated by default, if the UE receives an RRC Reconfiguration message which contains mobilityControlInfo (e.g., when the serving base station triggers a handover to the UE) from the serving base station. However, it is noted that, in LTE systems, both PCell and PSCell cannot be deactivated, although it is possible to deactivate SCell(s) in an SCG.

In various implementations of the present disclosure, Duplication may be affected by a Deactivation Timer. In addition, a PSCell may be deactivated when a PSCellDeactivationTimer is applied to a PSCell. In some implementations, a PSCell may be deactivated if all of the SCells in the CG are deactivated, and the RAN (e.g., MN or SN) may configure a PSCellDeactivationTimer to a UE. In some implementations, both a UE and an SN of the CG may set a deactivation timer PS Cell=PSCellDeactivationTimer, and start counting if all of the SCells to the UE are deactivated. In some implementations, the deactivation timer PSCell may be reset if a new packet exchange on a PSCell or any SCell in the CG is activated by the RAN. In some implementations, the RAN can configure independent PSCellDeactivationTimers to different PSCells of different CGs of a UE.

For brevity, the following implementations of the deactivation timer are described with respect to SCells (e.g., SCellDeactivationTimer and the Deactivation Timer for SCells). However, implementations of the deactivation timer may also be applied to both PCell and PSCell.

In various implementations of the present disclosure, a Deactivation Timer may be disabled either explicitly or implicitly.

Table 5-1 illustrates example implicit approaches to disable a Deactivation Timer.

TABLE 5-1

Example implicit approaches to disable a Deactivation Timer

Implicit approaches to disable a De-activation Timer

| | |
|---|---|
| Approach#Z-1 (All CGs) | UE disables the De-activation Timers of all SCells in all CGs when Duplication is activated (or configured) by RAN<br>UE may re-set De-activation Timer of all SCells in all CGs = SCellDeactivationTimer and then start counting after Duplication is de-activated (or de-configured) by RAN. |
| Approach#Z-2 (CG based) | UE disables the De-activation Timers of all SCells of the CG which involves Duplication (at least one Cell in the CG is the Operation Cell).<br>UE may re-set De-activation Timer = SCellDeactivationTimer to all SCells in the CG and then start counting when no Cell in the CG is involved in Duplication (Operation Cells are re-selected by Base Station Explicit Signaling or Event-based UE Self-(re)selection). |
| Approach#Z-3 (SCell based) | UE may only disable the De-activation Timers of SCells which are Operation Cells (e.g., selected by Implementation #X1 or Implementation #X2).<br>UE may re-set De-activation Timer of the SCell = SCellDeactivationTimer when the SCell is not an Operation Cell (e.g., re-selected by Base Station Explicit Signaling or Event-based UE Self-(re)selection). |
| Approach#Z-4 (Minimum number of activated Cell) | (1) All the counting of De-activation Timers are un-changed.<br>(2) RAN defines the "minimum number of activated Cell" ($N_A$) to the UE.<br>(3) UE is to de-activate SCells until number the activated Cells = $N_A$<br>Steps (1)-(3) may be applied to all the SCells or it can be implemented per CG basis.<br>The PCell/PSCell may or may not be included in the counting of number of activated Cell. |

In some implementations, a UE may disable the Deactivation Timers of all SCells in all CGs when Duplication is activated (Approach #Z-1). In some implementations, a UE may disable the Deactivation Timers of all SCells in one CG (Approach #Z-2) when at least one Cell in the CG is selected for Duplication. In some implementations, A UE may disable the Deactivation Timer of the SCell selected for Duplication (Approach #Z-3). In Approach #Z-4, the counting process of the Deactivation Timers are the same. However, the RAN may provide a "minimum number of activated Cell (NA)" to the UE to prevent the UE from deactivating too many cells to avoid not having enough cells for Duplication. The UE may deactivate the SCells based on the Deactivation Timers until the number of activated cells reaches to the NA. When the number of activated cells reaches to the NA during Duplication, the UE may disable the Deactivation Timers of all SCells until the number of activated cells becomes greater than the NA.

It is noted that in the LTE DC operation, an sCellDeactivationTimer is provided for each CG, and the value of the sCellDeactivationTimer is applied to all of the SCells in the CG. By contrast, according to implementations of the present disclosure, the RAN may configure different sCellDeactivationTimer values to different cells and their corresponding component carriers.

In addition to implicit approaches to disable a Deactivation Timer, implementations of the present disclosure may also disable the Deactivation Timer through explicit approaches. For example, the RAN (e.g., having MN and SN(s)) may configure two values to an sCellDeactivationTimer, one is sCellDeactivationTimer (Duplication activated) and the other is CellDeactivationTimer(Duplication de-activated), when the RAN is configuring Duplication to the UE. So, the UE may set Deactivation Timer=sCellDeactivationTimer(Duplication activated) after Duplication is activated. On the other hand, the UE may set the Deactivation Timer=sCellDeactivationTimer(Duplication de-activated) when Duplication is de-activated. The sCellDeactivationTimer (activated) and sCellDeactivationTimer(de-activated) may be configured by the RAN (e.g., MN or SN). In some implementations, the RAN may only provide sCellDeactivationTimer (activated) or sCellDeactivationTimer (de-activated) to the UE. In some implementations, the RAN may configure a set of {sCellDeactivationTimer (activated) and/or sCellDeactivationTimer(de-activated)} to all SCells (and PSCells) of the UE. In some other implementations, the RAN may configure different {sCellDeactivationTimer (activated) and/or sCellDeactivationTimer(de-activated)} to each component carrier, CG, or cell.

In some implementations, the deactivation of a cell may be independent of Duplication operations, where the UE may decide and/or select the appropriate cells to activate and deactivate Duplication. For CA operations, if all SCells are deactivated, then the Duplication on the SCells may be deactivated accordingly. From the UE/RAN's perspective, if there is no available SCell for Duplication, the UE/RAN may stop the activated Duplication functionalities in the PDCP layer accordingly. Then, the serving base station (e.g., a gNB) may need to identify other solutions to meet the service reliability.

In some implementations, when event-based UE self-(re)selection is configured, a UE may (re)select an operation cell(s) automatically, and may need to report the selected operation cell(s) for Duplication (e.g., UL Duplication), if the Deactivation Timer of the selected operation cell(s) (or CG) needs to be disabled during Duplication, and/or be enabled after Duplication is deactivated. This is because the base station (e.g., gNB) may consider that an SCell is deactivated automatically if the base station has configured sCellDeactivationTimer to the UE, but the UE decides to utilize the deactivated SCell for Duplication based on event-based UE self-(re)selection and the Deactivation Timer is disabled. In this situation, the UE attempts to deliver packets on an SCell which the base station deems to be deactivated. To avoid conflict between the UE and the serving base station, the UE needs to inform the RAN which SCell(s) the UE chooses for Duplication after the UE decides to select/re-select the operation cell(s) through the event-based UE self-(re)selection.

Figure 5A:
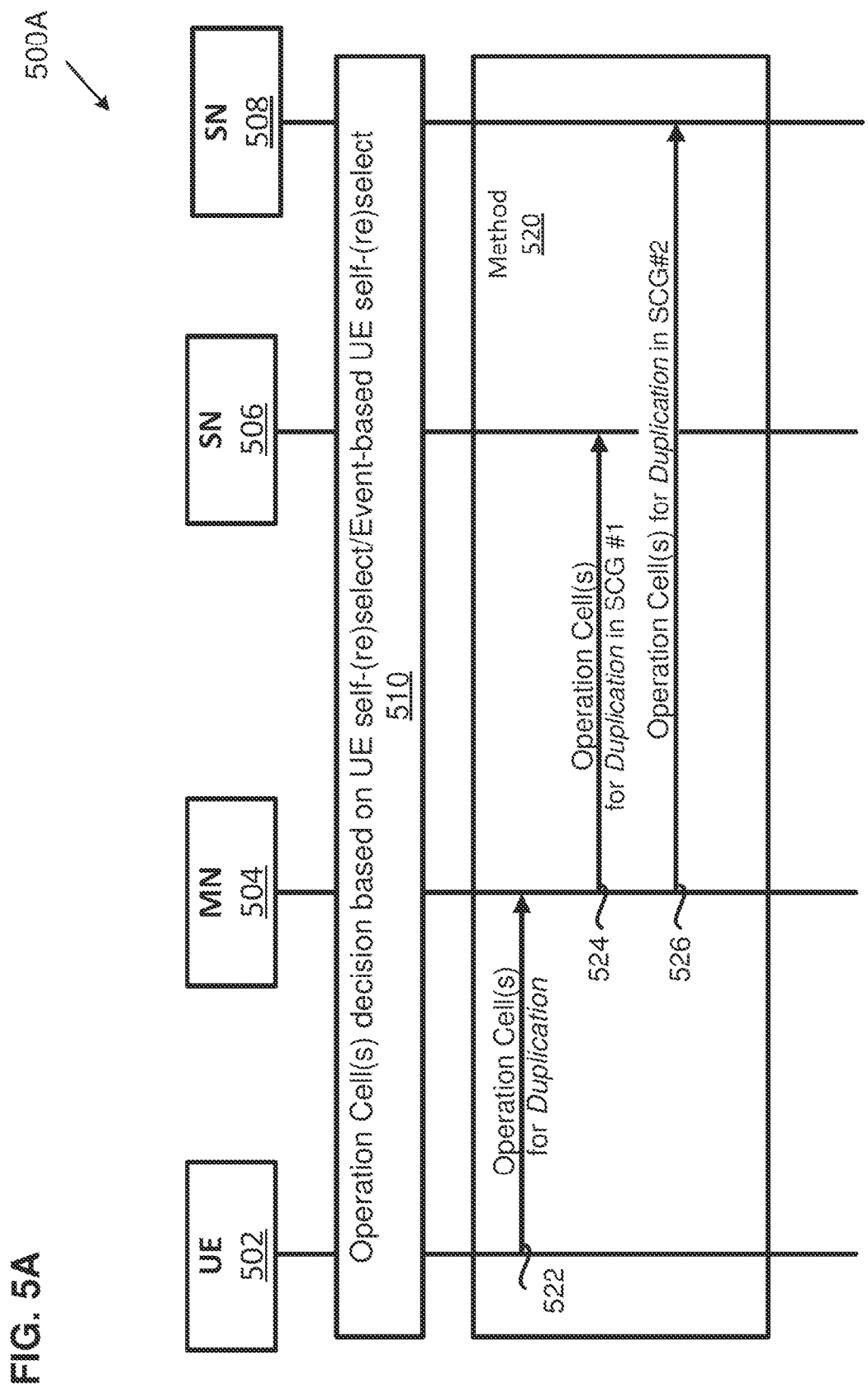
FIG. 5A is a diagram showing a method of a UE informing operation cell(s) for Duplication to various network nodes, in accordance with an example implementation of the present disclosure.

FIG. 5A is a diagram showing a method of a UE informing operation cell(s) for Duplication to various network nodes, in accordance with an implementation of the present disclosure. As shown in diagram 500A, in action 510, UE 502 may report operation cell(s) to the RAN (e.g., MN 504, SN 506, and SN 508) after UE 502 selecting the operation cell(s) based on UE self-(re)selection or event-based UE self-(re)selection. UE 502 may be configured with MCG, SCG #1 and SCG #2, where MN 504 is in charge of MCG, SN 506 is in charge of SCG #1, and SN 508 is in charge of SCG #2. In method 520, UE 502 may only inform MN 504 about the selected operation cell(s) for Duplication (e.g., UL Duplication) in action 522. In action 524, MN 504 may inform SN 506 about the selected operation cell(s) for Duplication in SCG #1. In action 526, MN 504 may inform SN 508 about the selected operation cell(s) for Duplication in SCG #2.

FIG. 5B is a diagram showing a method of a UE informing operation cell(s) for Duplication to various network nodes, in accordance with an implementation of the present disclosure. As shown in diagram 500B, in action 510, UE 502 may report operation cell(s) to the RAN (e.g., MN 504, SN 506, and SN 508) after UE 502 selecting the operation cell(s) based on UE self-(re)selection or event-based UE self-(re)selection. UE 502 may be configured with MCG, SCG #1 and SCG #2, where MN 504 is in charge of MCG, SN 506 is in charge of SCG #1, and SN 508 is in charge of SCG #2. In method 530, UE 502 may deliver the operation cell(s) for Duplication to each of the network nodes in charge of their corresponding CGs. For example, in action 532, UE 502 may inform MN 504, when UE 502 selects one or more SCells in MCG for Duplication (e.g., UL Duplication). In action 534, UE 502 may inform SN 506, when UE 502 selects one or more SCell(s) in SCG #1 for Duplication (e.g., UL Duplication). In action 536, UE 502 may inform SN 508, when UE 502 selects one or more SCells in SCG #2 for Duplication (e.g., UL Duplication). After receiving information on the operation cell(s) for Duplication, the network nodes (e.g., MN 504, SN 506, or SN 508) may know that the Deactivation Timers of the selected operation cell(s) (or related CGs) may be disabled until UE 502 selects other operation cell(s) (or CG(s)). Also, in some implementations, UE 502 may also apply method 520 or 530 to refresh the operation cell(s) when UE 502 finishes Duplication on the selected operation cell(s).

In some implementations, the Deactivation Timers are disabled on a per-CG basis (Approach #Z-2 in Table 5-1). So, the UE may not need to report all the operation cells for Duplication to the RAN. In method 520 in FIG. 5A, UE 502 may provide a bitmap to MN 504. In the bitmap, each bit may correspond to a CG (e.g., a 3-bits bitmap; the $1^{st}$ bit represents MCG of MN 504, the $2^{nd}$ bit represents SCG #1 of SN 506, and the $3^{rd}$ bit represents SCG #2 of SN 508). So, UE 502 may set one bit in the bitmap to "1" to indicate that all the Deactivation Timers of the cells in the corresponding CG are disabled. In contrast, UE 502 may set the corresponding bit(s) in the bitmap=0 when no cell in a CG(s) is selected for Duplication. As such, the RAN may re-set all the Deactivation Timers of the SCells in the CG(s). In method 530 in FIG. 5B, UE 502 may provide one control bit in a UL control signaling to MN 504, SN 506, and/or SN 508. Based on the control bit, MN 504, SN 506, and/or SN 508 may disable (when the control bit=1) or re-set (when the control bit=0) the Deactivation Timers of all SCells in the corresponding CG(s).

Case 3: Resource Configuration for Duplication

Figure 6:
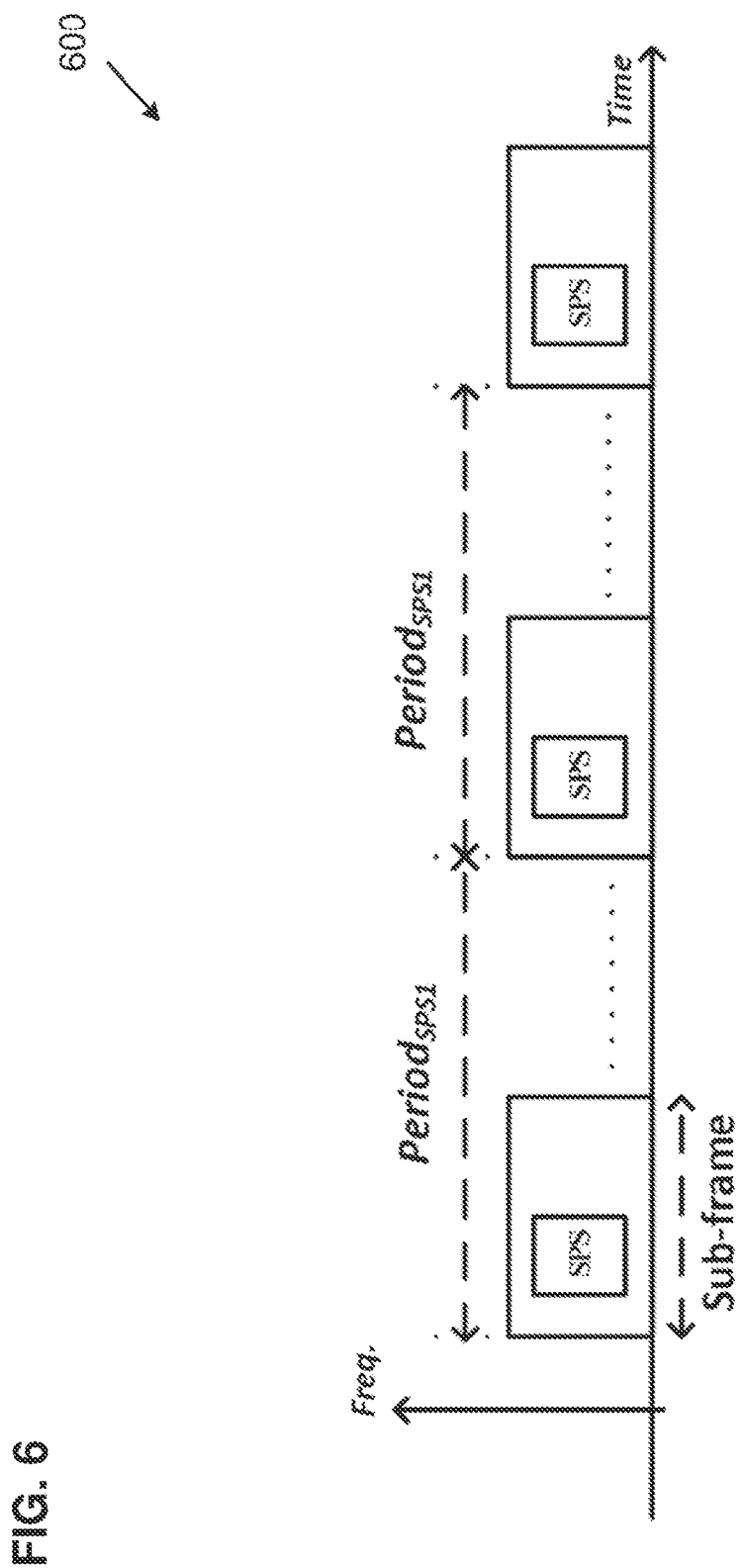
FIG. 6 is a diagram illustrating an SPS-configuration having the periodicity provided through Radio Resource Control (RRC) signaling, and resource blocks for SPS resource provided through L1 signaling, in accordance with an example implementation of the present disclosure.

Semi-Persistent-Scheduling (SPS) resource is radio resource that is provided to a UE periodically. SPS resource is configured and activated by the RAN. FIG. 6 shows a diagram of an SPS-configuration having the periodicity provided through RRC signaling, and resource blocks for SPS resource provided through L1 signaling, in accordance with an example implementation of the present disclosure. As shown in diagram 600, SPS resource appears periodically in time domain. Each SPS resource is indicated by a SPS-configuration. The SPS-configuration includes time periodicity (N sub-frames between two continuous SPS resource) and resource blocks (e.g., the 'SPS' resource blocks in the subframe which SPS resource is located). The RAN may provide the SPS-configuration through dedicated signalings (e.g., the RAN configures SPS resource through RRC signaling, and then activates SPS resource by L1 signaling such as Physical Downlink Control Channel). The UE may start using the configured SPS resource after RAN activating the SPS-configuration through L1 signaling. SPS can be applied to uplink, downlink, and sidelink direction. However, in LTE systems, SPS resource can only be applied to special cells (e.g., PCell and PSCell).

In accordance with implementations of the present disclosure, SPS resource may be improved to support Duplication. For example, SPS resource may be applied not only to special cells but also SCells in MCG or SCGs. In addition, multiple SPS-configuration may be configured by RAN to support different numerologies (e.g., Cyclic Prefix length, sub-carrier spacing). Moreover, a UE may require multiple radio bearers which each of them requires Duplication. In some implementations, the RAN may separate the SPS resource allocated to different radio bearers to guarantee the QoS of each radio bearer.

In various implementations of the present disclosure, multiple resource configurations may be configured to a UE for Duplication. However, there may only be one resource configuration utilized for each cell at any given time.

In Case 3, some resource configurations for Duplication are based on the Base Station Explicit Signaling approach. With reference to FIG. 2, base station 204 may provide the mapping configuration for Duplication, along with which the resource configuration for each cell may also be provided. For example, base station 204 may provide MAC CE to activate Duplication to allow UE 202 to start Duplication. With reference to FIG. 2, examples of the resource configuration are provided in Table 6-1. As shown in Table 6-1, three resource configurations {RC #a-1, RC #a-2, RC #a-3} are provided to sCellIndex #2, and {RC #b-1, RC #b-2, RC #b-3} are provided to sCellIndex #3. As such, base station 204 may further indicate which resource configuration UE 202 needs to apply in the MAC CE. As discussed above, UE 202 may use only one resource configuration in one cell at a time. The details of {RC #a-1, RC #a-2, RC #a-3} are shown in Table 6-1, where each of {RC #a-1, RC #a-2, RC #a-3} shows a different example of a resource configurations.

TABLE 6-1

Under the Base Station Explicit Signaling approach,
a base station configuring
at least one resource configuration to an operation cell.

| Type | LCH <-> Operation Cell | | Resource Configuration | | |
|---|---|---|---|---|---|
| Duplication | LCH#a CH#b | sCellIndexD CellIndex #3 | RC#a-1 RC#b-1 | RC#a-2 RC#b-2 | RC#a-3 RC#b-3 |

TABLE 6-2

Multiple Configurations in SCellIndex#2 of Table 6-1

| Resource Configuration in SCellIndex#2 | Periodicity (by TTI or subframe) | Resource allocation |
|---|---|---|
| RC#a-1 | $Period_{Rc\ \#1}$ represented by subframe (e.g., sf120, which means 120 ms periodicity). | {Resource Blocks Configuration (RBC#1) with bitmap} |
| RC#a-2 | Ex#1: $Period_{Rc\ \#2}$, represented by subframe e.g., sf20, which means 20 ms periodicity.<br>Ex#2: TTI (Transmission Time Interval) {e.g., TTI120}. UE is to calculate the periodicity by considering one TTI = one mini-slot if mini-slot is configured to the UE. | {Resource Blocks Configuration (RBC#2) without bitmap} |

TABLE 6-2-continued

Multiple Configurations in SCellIndex#2 of Table 6-1

| Resource Configuration in SCellIndex#2 | Periodicity (by TTI or subframe) | Resource allocation |
|---|---|---|
| RC#a-3 | Otherwise, UE considers one TTI = one subframe. $Period_{RC\ \#3}$ | N.A. (gNB provides RBC#3 in the Activation of Duplication message) |

Figure 7:
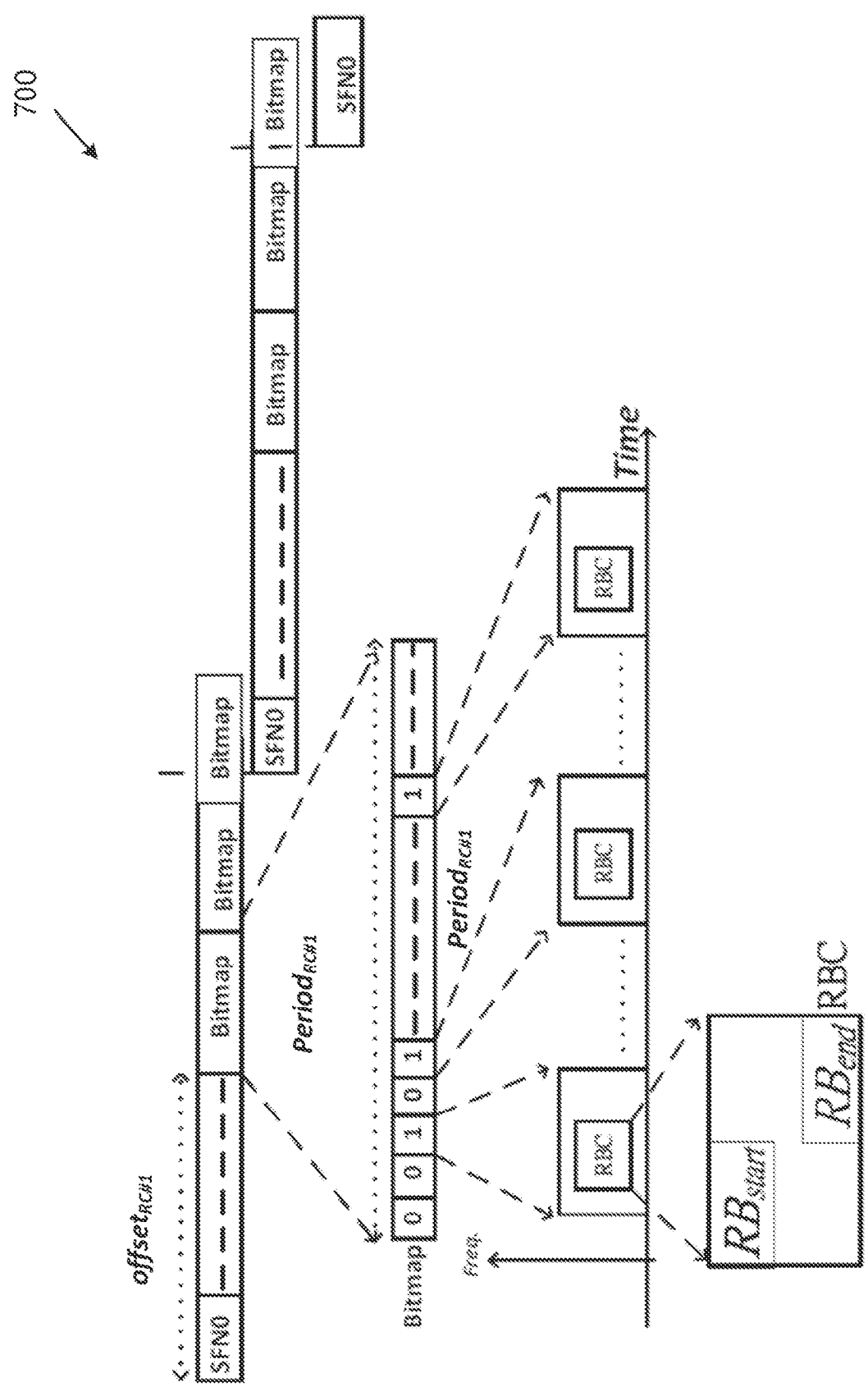
FIG. 7 is a diagram illustrating a bitmap for representing a resource configuration for Duplication, in accordance with an example implementation of the present disclosure.

Referring to Table 6-1, for RC #a-1, the periodicity and resource allocation are provided in the mapping configuration of RC #a-1. The resource allocation may be represented by a bitmap and a resource block configuration. FIG. 7 is a diagram of a bitmap for representing a resource configuration for Duplication, in accordance with an example implementation of the present disclosure. As shown in diagram 700, $Period_{RC\ \#1}$ is applied to represent the periodicity of a bitmap, and offsetRC #1 is used to represent the start of a radio frame in the system frame, the system frame is indexed from SFN (System Frame Number) No. 0 to SFN No. 1023 repeatedly in time domain, the base station (e.g., gNB) may update and deliver the SFN information in an air link. By reading the SFN information and offsetRC #1, the UE may determine at which radio frame the bitmap starts (e.g., the starting radio frame). In addition, each radio frame can be furthered divided into 10 subframes (e.g., Subframe #0 through Subframe #9). So, starting from the first subframe (subframe #0) of the starting radio frame, each bit in the bitmap is mapped to a corresponding subframe. A bit in the bitmap may be labeled as "1" if the corresponding subframe includes a resource block(s) for the UE to deliver duplicated PDCP PDU packets (if any). On the other hand, a bit in the bitmap is labeled as "0" if the corresponding subframe does not include a resource block(s) for the UE. The radio resource of each subframe may be divided into many resource blocks. In addition, each resource block may have an index in the technical specification. So, the RAN may provide the Resource Blocks Configuration (RBC) to the UE using two indices, {RBstart, RBend}. The UE may determine or identify where each resource block for Duplication starts and ends. In some implementations, the bitmap may be mapped periodically in a radio frame to represent the resource allocations in the following subframes till the end of radio frame. In addition, the last mapping bitmap in the radio frame may cross the boundary of two radio frames. Thus, the last mapping bitmap may map the resource allocations of subframes in the next system frame until the end of the last mapping bitmap.

In some implementations, only RC #a-1 is configured for each operation cell. In such case, the UE may apply Duplication immediately based on RC #a-1 after receiving the mapping configuration for Duplication. In some implementations, the UE may apply Duplication based on RC #a-1 only after receiving an Activation of Duplication message from the base station.

Referring back to Table 6-1, for RC #a-2, the resource allocation may be provided through {periodicity, RBC} without using a bitmap. The RBC is provided to the UE periodically. The base station may need to activate Duplication by delivering a dedicated signaling (e.g., an Activation of Duplication message) to activate RC #a-2. So, RC #a-2 is valid immediately in the subframe where the UE receives the Activation of Duplication message. Moreover, after receiving the dedicated signaling, periodical resource may be provided to the UE on the subframe based on the periodicity of Period$_{RC\ \#2}$. For example, the UE may receive a dedicated signaling to activate RC #a-2 on subframe N. Thus, resource blocks may be provided in subframe N for Duplication. Then, the next periodical resource for Duplication may be provided on the subframe N+Period$_{RC\ \#2}$+1). So, the UE may apply the following periodical resource automatically without a need for receiving further indication from the base station. In addition, the periodical resource in the subframe is provided through RBC (e.g., by indicating {RBstart, RBend}).

In some implementations, only RC #a-2 is configured for each operation cell in the mapping configuration. In such case, the base station may not need to further indicate the resource configuration in the Activation of Duplication message. In some implementations, the Period$_{RC\ \#2}$ may be configured by TTI (Transmission Time Interval), which is a configurable time unit and the default value of one TTI=one subframe. The base station may configure one TTI=one mini-slot. The time length of a mini-slot may be X symbols, and the value X is configurable. The RAN may configure the value of X to the UE through dedicated signaling (e.g., RRC signaling). So, when TTI length is applied to indicate the periodicity of Resource Configuration (e.g., Period$_{RC\ \#2}$=TTI120). UE may calculate Period$_{RC}$ #$_2$ by considering one TTI=one subframe, if mini-slot is not configured to the UE. Otherwise, the UE may calculate Period$_{RC\ \#2}$ by considering one TTI=one mini-slot.

Referring back to Table 6-1, for RC #a-3, the resource allocation may be provided through periodicity (Period$_{RC\ \#3}$), which means that the resource allocation is not provided with a mapping configuration for Duplication. In this case, the base station may need to activate Duplication by delivering the Activation of Duplication message with RBC, so that RC #a-3 can be valid immediately in the subframe at which the UE receives the Activation of Duplication message. Moreover, after the Activation of Duplication message, periodical resources may be provided to the UE to the subframe based on the periodicity of Period$_{RC\ \#3}$, and the resource allocation is provided through RBC.

In some implementations, only RC #a-3 is configured for each operation cell in the mapping configuration. In such case, the base station may need not to further indicate the resource configuration in the Activation of Duplication message.

In the Base Station Explicit Signaling approach, it is possible that more than one resource configuration may be provided to one operation cell (as shown in Table 6-1) in the mapping configuration. In such case, the base station may need to further indicate which resource configuration that the UE should follow in the Activation of Duplication message by using resource block bits (RC bits) in the Activation of Duplication message. As shown in Table 6-3, the resource configurations in the mapping configuration may be indexed based on their sequence in the payload. For example, in Table 6-1, RC #a-1 is the first resource configuration, RC #a-2 is the second resource configuration, and so on). Then, based on the indices of the resource configurations, the RC bits may be provided in the Activation of Duplication message to indicate the resource configurations that the UE may use in the corresponding operation cells. Table 6-4 provides an example format in the Activation of Duplication message. In Table 6-4, the base station may indicate which radio bearer that the UE may activate the Duplication function in the PDCP layer and to what logical channels that duplicated PDCP PDU packets are delivered in RLC layer. In addition, the operation cell(s) and resource configuration(s) for each logical channel may also be configured by the Operation Cell bits (OC bits) and RC bits.

TABLE 6-3

RC bits is provided to indicate the resource configuration which a UE should apply based on the indices of resource configurations

| RC bits in Activation of Duplication message | Resource Configuration |
|---|---|
| 00 | RC #a-1 |
| 01 | RC #a-2 |
| 10 | RC #a-3 |

TABLE 6-4

Example Activation of Duplication message in which operation cell bits and RC bits are provided to a UE

| Activation Bearer | Logical Channel | Operation Cell bits | Resource Configuration |
|---|---|---|---|
| DRB ID/SRB ID | LCH#a | 01 | 00 |
|  | LCH#b | 10 | 10 |

In ImplementationX2 and ImplementationX3 (in Table 3) of Case 1, the UE may select the operation cell(s) based on the UE's own decision. For the resource configuration of Duplication in ImplementationX2 and/or ImplementationX3, the serving base station (e.g., gNB) may provide only one resource configuration for each cell when the serving base station is providing the mapping configuration to the UE, as shown in Table 6-5. So, the UE may apply the given resource configuration on the decided operation cell directly after the UE selects or re-selects the operation cell(s)s based on the UE's own decision.

TABLE 6-5

Example mapping configuration having {CG indices, SCellindices, Resource Configuration} provided by an MN LCH <-> Operation Cell in MC scenario

| Type | CG index | LCH | Cell index | Resource Configuration |
|---|---|---|---|---|
| DL Duplication | MCG index | LCH#a | ServCellIndex# 1 (=sCellIndex# 1) | RC#a-1 |
|  | SCG#1 index | LCH#b | ServCellIndex# 2 (=sCellIndex 2) | RC#a-2 |
|  | SCG#2 index | LCH#c | ServCellIndex# 3 (=sCellIndex 3) | RC#a-3 |
| UL Duplication | MCG index | LCH#m | ServCellIndex# 0 ("0000"(PCell)) | RC#a-1 |
|  | SCG#1 index | LCH#n | ServCellIndex # 4 (=sCellIndex # 4) | RC#a-3 |

In some implementations, the RAN may require the UE to send a Buffer Status Report (BSR) for the RAN to decide the dedicated resource for the UE to deliver duplicated PDCP PDU packets. For the BSR, the RAN may configure the logical channel groups (LCGs) to each UE. Each LCG is a group of logical channels whose pending packets amount may be accumulated in one LCG in the BSR. Thus, the UE may only report the buffer status of each LCG instead of each of the logical channels. The Duplication process may affect the BSR since the logical channels may be activated and/or deactivated occasionally.

Figure 8:
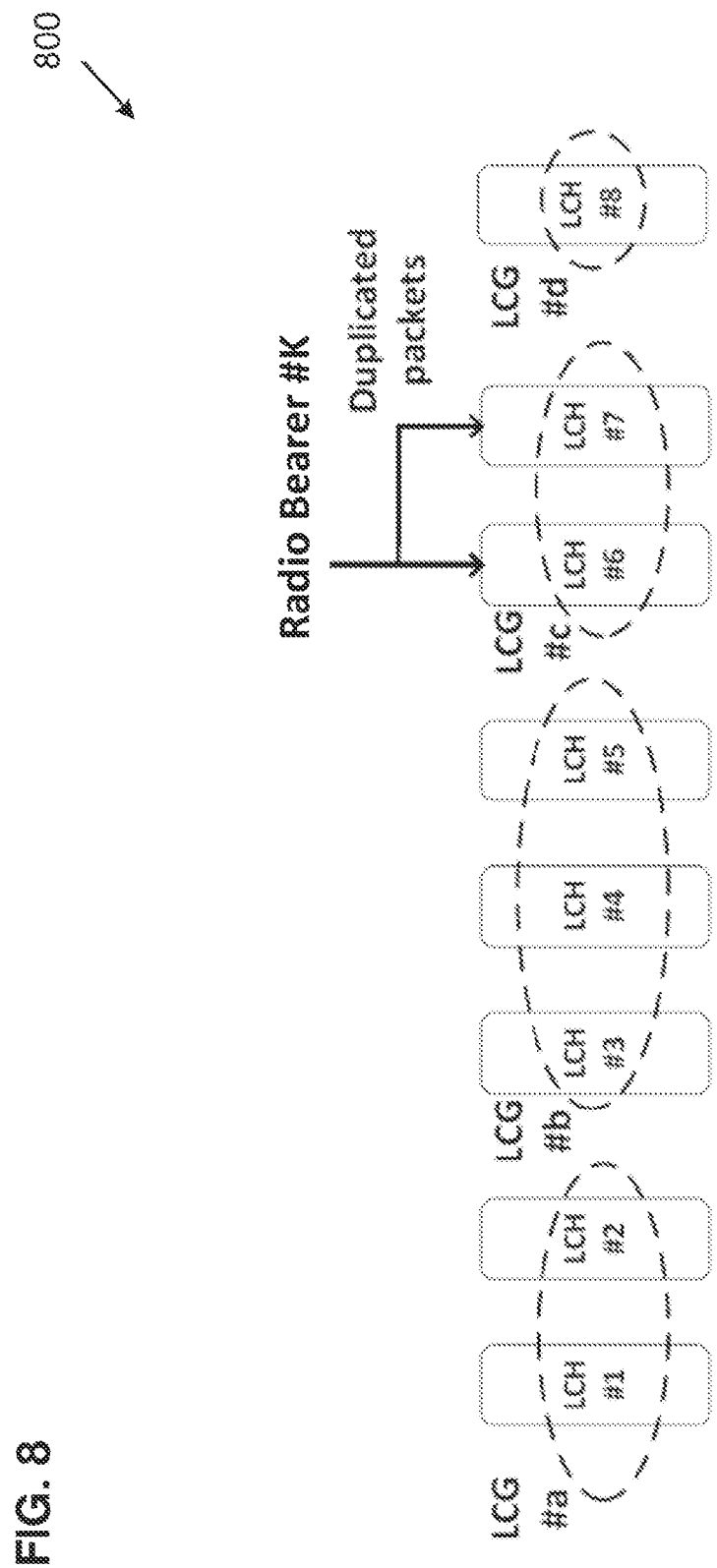
FIG. 8 is a diagram illustrating a RAN providing mappings between LCHs and LCGs for BSR, in accordance with an example implementation of the present disclosure.

FIG. 8 is a diagram illustrating a RAN providing mappings between LCHs and LCGs for BSR, in accordance with an example implementation of the present disclosure. As shown in diagram 800, the Duplication function of Radio bearer #K is activated. Before the activation of Duplication, the packets of Radio bearer #K are delivered to LCH #6. Then, the duplicated PDCP PDU packets may be delivered to LCH6 and LCH #7 after the Duplication is activated. So, after the Duplication is activated, the RAN may need to re-indicate the LCG of the UE since the LCH is activated. In addition, when Duplication of a radio bearer is activated, LCH #7 is activated, thus packets are forwarded to LCH #7. Then, a new BSR process may be triggered when new packets arrive at the buffer of LCH #7. However, since the amount of the pending packets in LCH #7 is substantially the same as the amount of the pending packets in LCH #6, the RAN may obtain the buffer status of the pending packets in LCH #7 by receiving the buffer status of LCH #6. Thus, a new BSR may not be necessary.

Although Duplication may affect LCGs and/or BSR, the impact of Duplication on BSR may be reduced by the following mechanisms described below.

In the present implementation, a radio bearer which is originally mapped to the original logical channel (e.g., LCH #O). A duplicated logical channel (LCH #D) is activated to deliver duplicated PDCP PDU packets. In the present implementation, the base station does not provide additional LCG information for LCH #D. LCH #D may be regarded as with the same LCG as the LCH #0, since both LCH #0 and LCH #D both carry substantially the same duplicated PDCP PDU packages. In addition, LCH #D does not activate the BSR process. To the radio bearer, the BSR process is triggered and reported based on LCH #O.

Figure 9:
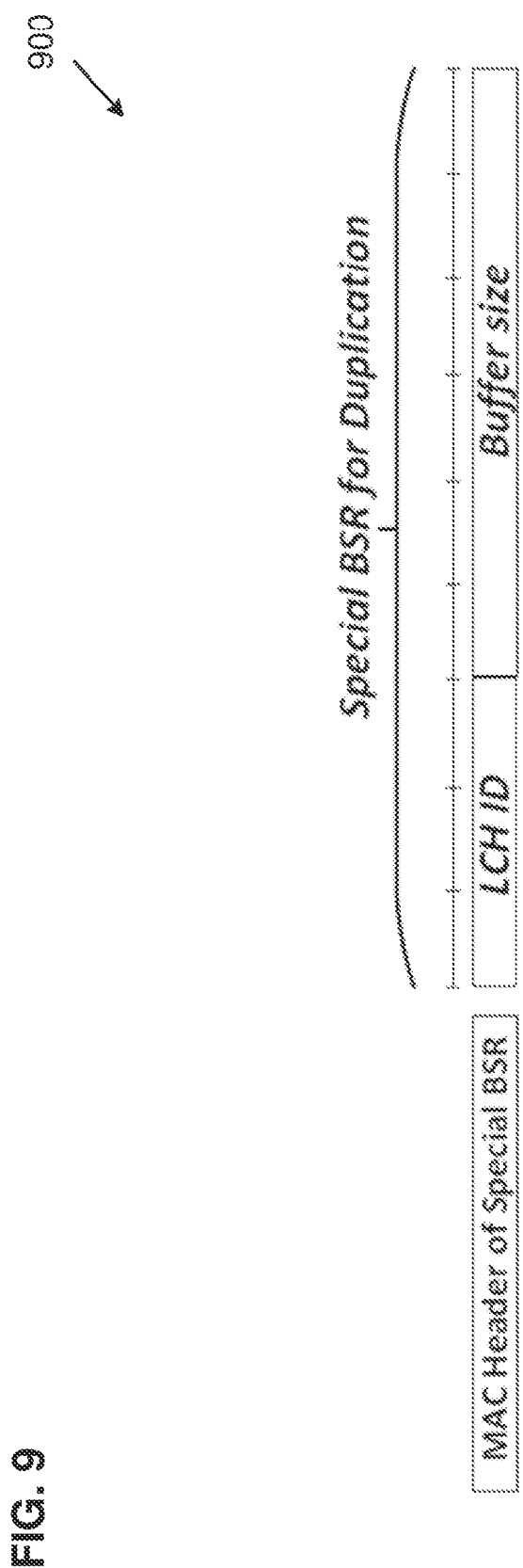
FIG. 9 is a diagram illustrating a special BSR for Duplication, in accordance with an example implementation of the present disclosure.

In the present implementation, a special BSR format is provided for the UE to report the buffer size of LCH #0. After receiving the special BSR for Duplication, the RAN may know that both LCH #O and LCH #D have pending packets to transmit. FIG. 9 is a diagram illustrating a special BSR for Duplication, in accordance with an example implementation of the present disclosure. As shown in diagram 900, a special BSR for Duplication includes a MAC header and a payload, which includes an LCH ID and a buffer size of LCH #0. The base station may differentiate the special BSR for Duplication from other MAC CEs by reading the MAC header (e.g., a different Logical Channel ID (LCID) is configured for the special BSR for Duplication). After reading the MAC header, the base station may identify the LCH ID of LCH #0. The pending packets of LCH #O may be provided in the payload of the special BSR for Duplication. In addition, the base station may ascertain or know that there are also pending packets in the LCH #D.

In the present implementation, after receiving the special BSR for Duplication, the base station may need to provide UL radio resources for UE to deliver the pending packets in LCH #O and LCH #D. In some implementations, the base station may utilize cross-carrier scheduling in the UL resource allocation to achieve frequency diversity.

Figure 10:
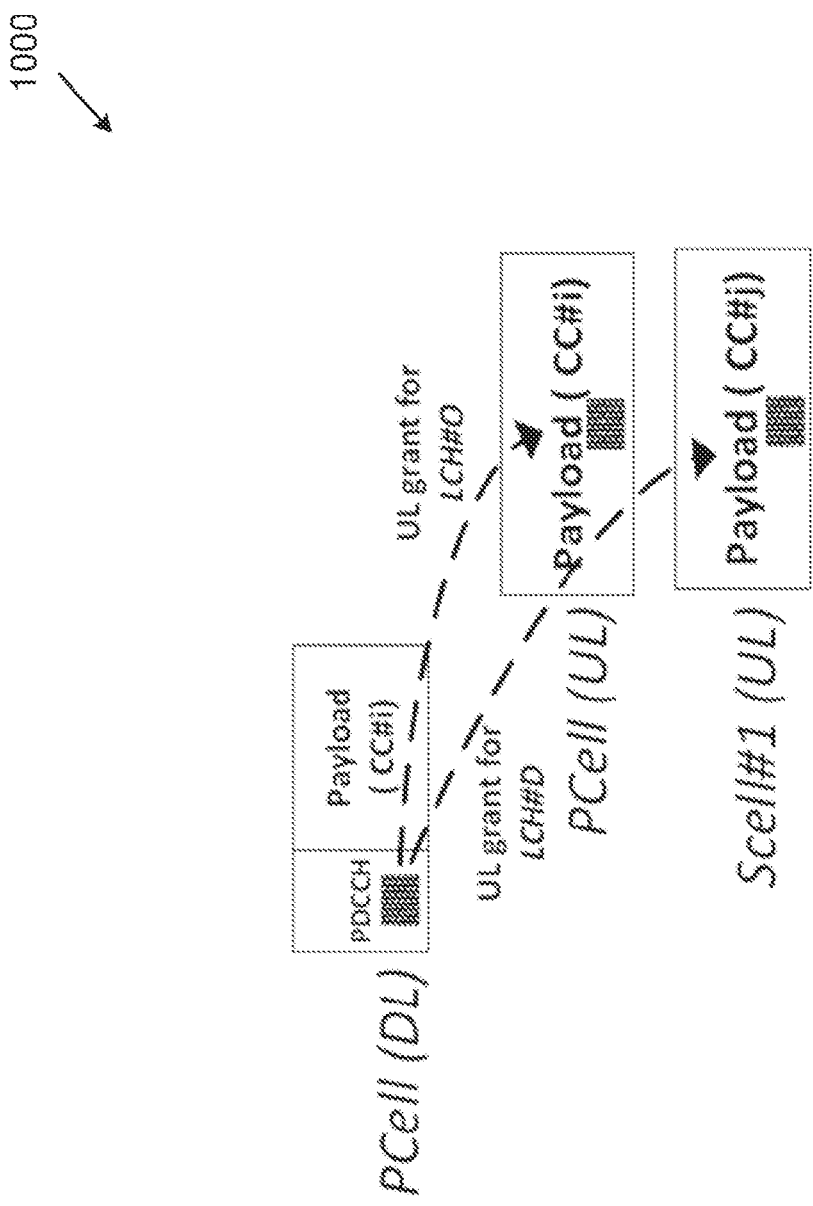
FIG. 10 is a diagram illustrating cross-carrier scheduling for Duplication, where the mapping between logical channels and cells are pre-defined by a base station, in accordance with an example implementation of the present disclosure.

FIG. 10 is a diagram illustrating cross-carrier scheduling for Duplication, where the mapping between logical channels and cells are pre-defined by a base station, in accordance with an example implementation of the present disclosure. As shown in diagram 1000, the base station may provide a UL resource grant on the DL PCell PDCCH (Physical Downlink Control Channel). The UL grant for the UE may include the UL grant for LCH #O and LCH #D, which are located on PCell (UL) and SCell #1 (UL), respectively. Moreover, the mapping between LCH #O and PCell, and between LCH #D and SCell #1, is already configured by the RAN based on Case 1 above. Thus, after receiving the UL grant from the base station, the UE may know what the resource on PCell (UL) may be utilized to deliver the pending packets of LCH #O, and the resource on SCell #1 (UL) may be utilized to deliver the pending packets of LCH #D.

It should be understood that the special BSR for Duplication and the UL grant approaches can also be applied to CA, DC (e.g., MN or SN can configure BSR and provide UL resources independently), and MC operations.

Figure 11:
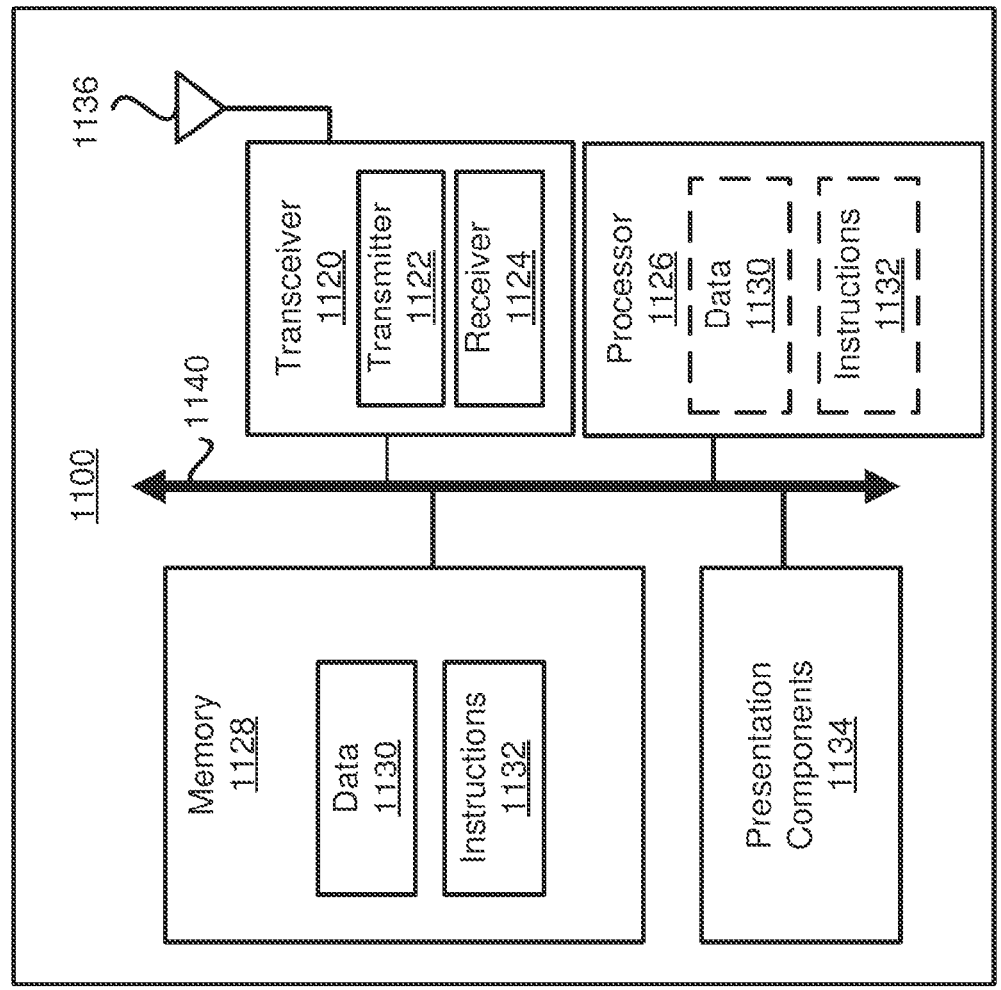
FIG. 11 is a block diagram of a node for wireless communication, in accordance with various aspects of the present disclosure.

FIG. 11 illustrates a block diagram of a node for wireless communication, in accordance with various aspects of the present disclosure. As shown in FIG. 11, node 1100 may include a transceiver 1120, a processor 1126, a memory 1128, one or more presentation components 1134, and at least one antenna 1136. The node 1100 may also include an Radio Frequency (RF) spectrum band module, a base station communications module, a network communications module, and a system communications management module, input/output (I/O) ports, I/O components, and power supply (not explicitly shown in FIG. 11). Each of these components may be in communication with each other, directly or indirectly, over one or more buses 1140.

The transceiver 1120 having a transmitter 1122 and a receiver 1124 may be configured to transmit and/or receive time and/or frequency resource partitioning information. In some implementations, the transceiver 1120 may be configured to transmit in different types of subframes and slots including, but not limited to, usable, non-usable and flexibly usable subframes and slot formats. The transceiver 1120 may be configured to receive data and control channels.

The node 1100 may include a variety of computer-readable media. Computer-readable media can be any available media that can be accessed by the node 1100 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 1128 may include computer-storage media in the form of volatile and/or non-volatile memory. The memory 1128 may be removable, non-removable, or a combination thereof. Example memory includes solid-state memory, hard drives, optical-disc drives, and etc. As illustrated in FIG. 11, The memory 1128 may store computer-readable, computer-executable instructions 1132 (e.g., software codes) that are configured to, when executed, cause the processor 1126 to perform various functions described herein, for example, with reference to FIGS. 1 through 10. Alternatively, the instructions 1132 may not be directly executable by the processor 1126 but be configured to cause the node 1100 (e.g., when compiled and executed) to perform various functions described herein.

The processor 1126 may include an intelligent hardware device, e.g., a central processing unit (CPU), a microcontroller, an ASIC, and etc. The processor 1126 may include memory. The processor 1126 may process the data 1130 and the instructions 1132 received from the memory 1128, and information through the transceiver 1120, the base band communications module, and/or the network communications module. The processor 1126 may also process information to be sent to the transceiver 1120 for transmission through the antenna 1136, to the network communications module for transmission to a core network.

One or more presentation components 1134 presents data indications to a person or other device. Example presentation components 1134 include a display device, speaker, printing component, vibrating component, etc.

From the above description it is manifest that various techniques can be used for implementing the concepts described in the present disclosure without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present disclosure is not limited to the particular implementations described above, but many rearrangements, modifications, and substitutions are possible without departing from the scope of the present disclosure.

What is claimed is:

1. A first base station (BS) in a secondary cell group (SCG) associated with a user equipment (UE), the first BS comprising:
   one or more non-transitory computer-readable media storing computer-executable instructions; and
   at least one processor coupled to the one or more non-transitory computer-readable media and configured to execute the computer-executable instructions to:
      receive, from a second BS in a master cell group (MCG) associated with the UE, a request for a configuration for packet data convergence protocol (PDCP) data duplication;
      generate a mapping configuration for the PDCP data duplication in the SCG after receiving the request; and
      transmit, to the UE, the mapping configuration.

2. The first BS of claim 1, wherein the at least one processor is further configured to execute the computer-executable instructions to:
   configure, based on the mapping configuration, a set of allowed serving cells in the SCG for receiving one or more duplicated PDCP packets, the set of allowed serving cells including at least one primary secondary cell (PSCell) and one or more secondary cells (SCells) of the SCG.

3. The first BS of claim 2, wherein the mapping configuration provides mapping rules between a set of logical channels and the set of allowed serving cells.

4. The first BS of claim 2, wherein the mapping configuration provides a set of serving cell indices corresponding to the set of allowed serving cells for receiving the one or more duplicated PDCP packets.

5. The first BS of claim 4, wherein a serving cell index in the set of serving cell indices that has a value of zero is mapped to the PSCell in the SCG that corresponds to at least one logical channel through which the UE is allowed to deliver the one or more duplicated PDCP packets.

6. The first BS of claim 1, wherein the mapping configuration for the PDCP data duplication includes information of at least one physical radio resource block on a set of allowed serving cells for receiving one or more duplicated PDCP packets from the UE.

7. The first BS of claim 1, wherein the at least one processor is further configured to execute the computer-executable instructions to:
   transmit, to the UE, a PDCP data duplication activation message to activate at least one logical channel corresponding to at least one radio bearer of the UE to deliver one or more duplicated PDCP packets.

8. The first BS of claim 7, wherein the at least one processor is further configured to execute the computer-executable instructions to:
   receive, from the UE, the one or more duplicated PDCP packets in the at least one logical channel corresponding to the at least one radio bearer of the UE.

9. The first BS of claim 1, the at least one processor is further configured to execute the computer-executable instructions to:
   transmit, to the UE, a PDCP data duplication deactivation message to stop the UE from applying one or more allowed serving cells in the SCG to the at least one logical channel.

10. The first BS of claim 1, wherein the second BS further transmits, to the UE, a second mapping configuration for PDCP data duplication in the MCG.

11. A method performed by a first base station (BS) in a secondary cell group (SCG) associated with a user equipment (UE), the method comprising:
   receiving, from a second BS in a master cell group (MCG) associated with the UE, a request for a configuration for packet data convergence protocol (PDCP) data duplication;
   generating a mapping configuration for the PDCP data duplication in the SCG after receiving the request; and
   transmitting, to the UE, the mapping configuration.

12. The method of claim 11, further comprising:
   configuring, based on the mapping configuration, a set of allowed serving cells in the SCG for receiving one or more duplicated PDCP packets, the set of allowed serving cells including at least one primary secondary cell (PSCell) and one or more secondary cells (SCells) of the SCG.

13. The method of claim 12, wherein the mapping configuration provides mapping rules between a set of logical channels and the set of allowed serving cells.

14. The method of claim 12, wherein the mapping configuration provides a set of serving cell indices corresponding to the set of allowed serving cells for receiving the one or more duplicated PDCP packets.

15. The method of claim 14, wherein a serving cell index in the set of serving cell indices that has a value of zero is mapped to the PSCell in the SCG that corresponds to at least one logical channel through which the UE is allowed to deliver the one or more duplicated PDCP packets.

16. The method of claim 11, wherein the mapping configuration for the PDCP data duplication includes information of at least one physical radio resource block on a set of allowed serving cells for receiving one or more duplicated PDCP packets from the UE.

17. The method of claim 11, further comprising:
transmitting, to the UE, a PDCP data duplication activation message to activate at least one logical channel corresponding to at least one radio bearer of the UE to deliver one or more duplicated PDCP packets.

18. The method of claim 17, further comprising:
receiving, from the UE, the one or more duplicated PDCP packets in the at least one logical channel corresponding to the at least one radio bearer of the UE.

19. The method of claim 11, further comprising:
transmitting, to the UE, a PDCP data duplication deactivation message to stop the UE from applying one or more allowed serving cells in the SCG to the at least one logical channel.

20. The method of claim 11, wherein the second BS further transmits, to the UE, a second mapping configuration for PDCP data duplication in the MCG.

* * * * *